(12) United States Patent
Xu et al.

(10) Patent No.: US 12,408,172 B2
(45) Date of Patent: Sep. 2, 2025

(54) UPLINK CANCELATION INDICATION

(71) Applicant: QUALCOMM Incorporated, San Diego, CA (US)

(72) Inventors: Changlong Xu, Beijing (CN); Jing Sun, San Diego, CA (US); Xiaoxia Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 439 days.

(21) Appl. No.: 17/911,118

(22) PCT Filed: Mar. 23, 2020

(86) PCT No.: PCT/CN2020/080605
§ 371 (c)(1),
(2) Date: Sep. 12, 2022

(87) PCT Pub. No.: WO2021/189178
PCT Pub. Date: Sep. 30, 2021

(65) Prior Publication Data
US 2023/0171779 A1  Jun. 1, 2023

(51) Int. Cl.
*H04W 72/21* (2023.01)

(52) U.S. Cl.
CPC .................................. *H04W 72/21* (2023.01)

(58) Field of Classification Search
CPC .... H04W 72/21; H04W 72/23; H04L 5/0007; H04L 5/0096
See application file for complete search history.

(56) References Cited

U.S. PATENT DOCUMENTS

2019/0109683 A1  4/2019 Kimura et al.
2019/0274187 A1  9/2019 Urabayashi et al.
(Continued)

FOREIGN PATENT DOCUMENTS

CN        106465411 A    2/2017
CN        109845383 A    6/2019
WO      2020033660 A1    2/2020

OTHER PUBLICATIONS

AT&T., et al., "RAN1 Ue Features List for Rel-16 NR after RAN1#100-E," 3GPP Draft, 3GPP TSG RAN WG1 #100-e, e-Meeting, R1-2001484, 3rd Generation Partnership Project (3GPP), Mobile Competence Centre, 650, Route Des Lucioles, F-06921, Sophia-Antipolis Cedex, France, vol. RAN WG1, No. e-meeting, Feb. 24, 2020-Mar. 6, 2020, Apr. 10, 2020 (Apr. 10, 2020), XP051873231, pp. 1-237, Retrieved from the Internet: URL: https://ftp.3gpp.org/tsg_ran/WG1_RL1/TSGR1_100_e/Docs/R1-2001484.zip R1-2001484_rel16_RAN1_UE features NR_afterR1#100E.docx, pp. 176, 177, The section 4, p. 119-p. 123.
(Continued)

*Primary Examiner* — Sudesh M. Patidar
(74) *Attorney, Agent, or Firm* — Loza & Loza, LLP

(57) ABSTRACT

A base station (BS) may cancel an uplink transmission that was previously scheduled for a user equipment (UE). For example, after scheduling a first UE for an uplink transmission on a particular resource, a BS may elect to schedule a second UE with higher priority traffic on at least a portion of that same resource. In this case, the BS may send an uplink cancelation indication (UL CI) to instruct the first UE to cancel its transmission. In some examples, for uplink transmissions on unlicensed radio frequency spectrum where an interlace structure and resource block (RB) sets are used for frequency-domain resource allocation, an UL CI may indi-
(Continued)

cate interlace and/or RB set parameters for the frequency domain

29 Claims, 12 Drawing Sheets

(56) References Cited

U.S. PATENT DOCUMENTS

| | | |
|---|---|---|
| 2020/0077453 A1 | 3/2020 | Babaei et al. |
| 2021/0168783 A1* | 6/2021 | Islam ................... H04L 5/0053 |
| 2022/0030618 A1* | 1/2022 | Wang .................. H04W 72/569 |
| 2022/0217750 A1* | 7/2022 | Liu ......................... H04L 5/003 |
| 2022/0272739 A1* | 8/2022 | Takahashi ......... H04W 72/1268 |
| 2022/0386243 A1* | 12/2022 | Liang ................. H04W 72/569 |

OTHER PUBLICATIONS

International Search Report and Written Opinion—PCT/CN2020/080605—ISA/EPO—Dec. 21, 2020.
Supplementary European Search Report—EP20926836—Search Authority—The Hague—Nov. 8, 2023.

* cited by examiner

# UPLINK CANCELATION INDICATION

CROSS-REFERENCE TO RELATED APPLICATION(S)

This application is the U.S. national stage of PCT patent application number PCT/CN2020/080605 filed on Mar. 23, 2020.

INTRODUCTION

The technology discussed below relates generally to wireless communication, and more particularly but not specifically, to techniques for canceling an uplink transmission.

Next-generation wireless communication systems (e.g., 5GS) may include a 5G core network and a 5G radio access network (RAN), such as a New Radio (NR)-RAN. The NR-RAN supports communication via one or more cells. For example, a user equipment (UE) may access a first cell of a first base station (BS) such as a gNB and/or access a second cell of a second BS.

A BS may schedule access to a cell to support access by multiple UEs. For example, a BS may allocate different resources (e.g., time domain and frequency domain resources) for different UEs operating within a cell of the BS.

As the demand for mobile broadband access continues to increase, research and development continue to advance communication technologies, including technologies for enhancing communication within a wireless network in particular, not only to meet the growing demand for mobile broadband access, but to advance and enhance the user experience with mobile communications.

BRIEF SUMMARY OF SOME EXAMPLES

The following presents a summary of one or more aspects of the present disclosure, in order to provide a basic understanding of such aspects. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in a form as a prelude to the more detailed description that is presented later.

Various aspects of the disclosure relate to canceling an uplink transmission. In some examples, after scheduling a first UE for an uplink transmission on a particular resource, a BS may elect to schedule a second UE with higher priority traffic on at least a portion of that same resource. In this case, the BS may send an uplink cancelation indication (UL CI) to instruct the first UE to cancel its transmission. For some transmissions on an unlicensed band (e.g., for New Radio-Unlicensed (NR-U) operation), an interlace structure and resource block (RB) sets are used for frequency-domain resource allocation. The disclosure relates in some aspects to an UL CI that can indicate interlace and/or RB set parameters for the frequency domain In some examples, a method of wireless communication at a wireless communication device may include receiving, from a base station, a first indication of a scheduled uplink transmission for the wireless communication device on an unlicensed radio frequency spectrum. The first indication may specify at least one scheduled interlace of a plurality of interlaces and at least one set of scheduled resource blocks of a plurality of sets of resource blocks. The method also may include receiving a cancelation indication from the base station. The cancelation indication may identify the at least one scheduled interlace, the at least one set of scheduled resource blocks, or the at least one scheduled interlace and the at least one set of scheduled resource blocks. The method may further include canceling the scheduled uplink transmission upon receiving the cancelation indication.

In some examples, a wireless communication device may include a transceiver, a memory, and a processor communicatively coupled to the transceiver and the memory. The processor and the memory may be configured to receive, from a base station via the transceiver, a first indication of a scheduled uplink transmission for the wireless communication device on an unlicensed radio frequency spectrum. The first indication may specify at least one scheduled interlace of a plurality of interlaces and at least one set of scheduled resource blocks of a plurality of sets of resource blocks. The processor and the memory also may be configured to receive a cancelation indication from the base station via the transceiver. The cancelation indication may identify the at least one scheduled interlace, the at least one set of scheduled resource blocks, or the at least one scheduled interlace and the at least one set of scheduled resource blocks. The processor and the memory may be further configured to cancel the scheduled uplink transmission upon receiving the cancelation indication.

In some examples, a wireless communication device may include means for receiving, from a base station, a first indication of a scheduled uplink transmission for the wireless communication device on an unlicensed radio frequency spectrum. The first indication may specify at least one scheduled interlace of a plurality of interlaces and at least one set of scheduled resource blocks of a plurality of sets of resource blocks. The wireless communication device also may include means for receiving a cancelation indication from the base station. The cancelation indication may identify the at least one scheduled interlace, the at least one set of scheduled resource blocks, or the at least one scheduled interlace and the at least one set of scheduled resource blocks. The wireless communication device may further include means for canceling the scheduled uplink transmission upon receiving the cancelation indication.

In some examples, an article of manufacture for use by a wireless communication device includes a computer-readable medium having stored therein instructions executable by one or more processors of the wireless communication device to In some examples, a method of wireless communication at a base station may include transmitting a first indication of a first scheduled uplink transmission on an unlicensed radio frequency spectrum to a first wireless communication device. The first indication may specify at least one interlace of a plurality of interlaces and at least one set of resource blocks of a plurality of sets of resource blocks. The first scheduled uplink transmission may be associated with a first priority. The method also may include determining that a second scheduled uplink transmission on the unlicensed radio frequency spectrum is associated with a second priority and generating a cancelation indication when the second priority is higher than the first priority. The cancelation indication may identify the at least one interlace, the at least one set of resource blocks, or the at least one interlace and the at least one set of resource blocks. The method may further include transmitting the cancelation indication to the first wireless communication device.

In some examples, a base station may include a transceiver, a memory, and a processor communicatively coupled to the transceiver and the memory. The processor and the memory may be configured to transmit a first indication of a first scheduled uplink transmission on an unlicensed radio frequency spectrum to a first wireless communication device via the transceiver. The first indication may specify at least one interlace of a plurality of interlaces and at least one set of resource blocks of a plurality of sets of resource blocks. The first scheduled uplink transmission may be associated with a first priority. The processor and the memory also may be configured to determine that a second scheduled uplink transmission on the unlicensed radio frequency spectrum is associated with a second priority and generate a cancelation indication when the second priority is higher than the first priority. The cancelation indication may identify the at least one interlace, the at least one set of resource blocks, or the at least one interlace and the at least one set of resource blocks. The processor and the memory may be further configured to transmit the cancelation indication to the first wireless communication device via the transceiver.

In some examples, a base station may include means for transmitting a first indication of a first scheduled uplink transmission on an unlicensed radio frequency spectrum to a first wireless communication device. The first indication may specify at least one interlace of a plurality of interlaces and at least one set of resource blocks of a plurality of sets of resource blocks. The first scheduled uplink transmission may be associated with a first priority. The base station also may include means for determining that a second scheduled uplink transmission on the unlicensed radio frequency spectrum is associated with a second priority and means for generating a cancelation indication when the second priority is higher than the first priority. The cancelation indication may identify the at least one interlace, the at least one set of resource blocks, or the at least one interlace and the at least one set of resource blocks. The base station may further include means for transmitting the cancelation indication to the first wireless communication device.

In some examples, an article of manufacture for use by a base station includes a computer-readable medium having stored therein instructions executable by one or more processors of the base station to transmit a first indication of a first scheduled uplink transmission on an unlicensed radio frequency spectrum to a first wireless communication device. The first indication may specify at least one interlace of a plurality of interlaces and at least one set of resource blocks of a plurality of sets of resource blocks. The first scheduled uplink transmission may be associated with a first priority. The computer-readable medium may also have stored therein instructions executable by one or more processors of the base station to determine that a second scheduled uplink transmission on the unlicensed radio frequency spectrum is associated with a second priority and generate a cancelation indication when the second priority is higher than the first priority. The cancelation indication may identify the at least one interlace, the at least one set of resource blocks, or the at least one interlace and the at least one set of resource blocks. The computer-readable medium may further have stored therein instructions executable by one or more processors of the base station to transmit the cancelation indication to the first wireless communication device.

These and other aspects of the disclosure will become more fully understood upon a review of the detailed description, which follows. Other aspects, features, and embodiments of the present disclosure will become apparent to those of ordinary skill in the art, upon reviewing the following description of specific, example embodiments of the present disclosure in conjunction with the accompanying figures. While features of the present disclosure may be discussed relative to certain embodiments and figures below, all embodiments of the present disclosure can include one or more of the advantageous features discussed herein. In other words, while one or more embodiments may be discussed as having certain advantageous features, one or more of such features may also be used in accordance with the various embodiments of the disclosure discussed herein. In similar fashion, while example embodiments may be discussed below as device, system, or method embodiments it should be understood that such example embodiments can be implemented in various devices, systems, and methods.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, embodiments and/or uses may come about via integrated chip embodiments and other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or OEM devices or systems incorporating one or more aspects of the described innovations. In some practical settings, devices incorporating described aspects and features may also necessarily include additional components and features for implementation and practice of claimed and described embodiments. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes and constitution.

Figure 1:
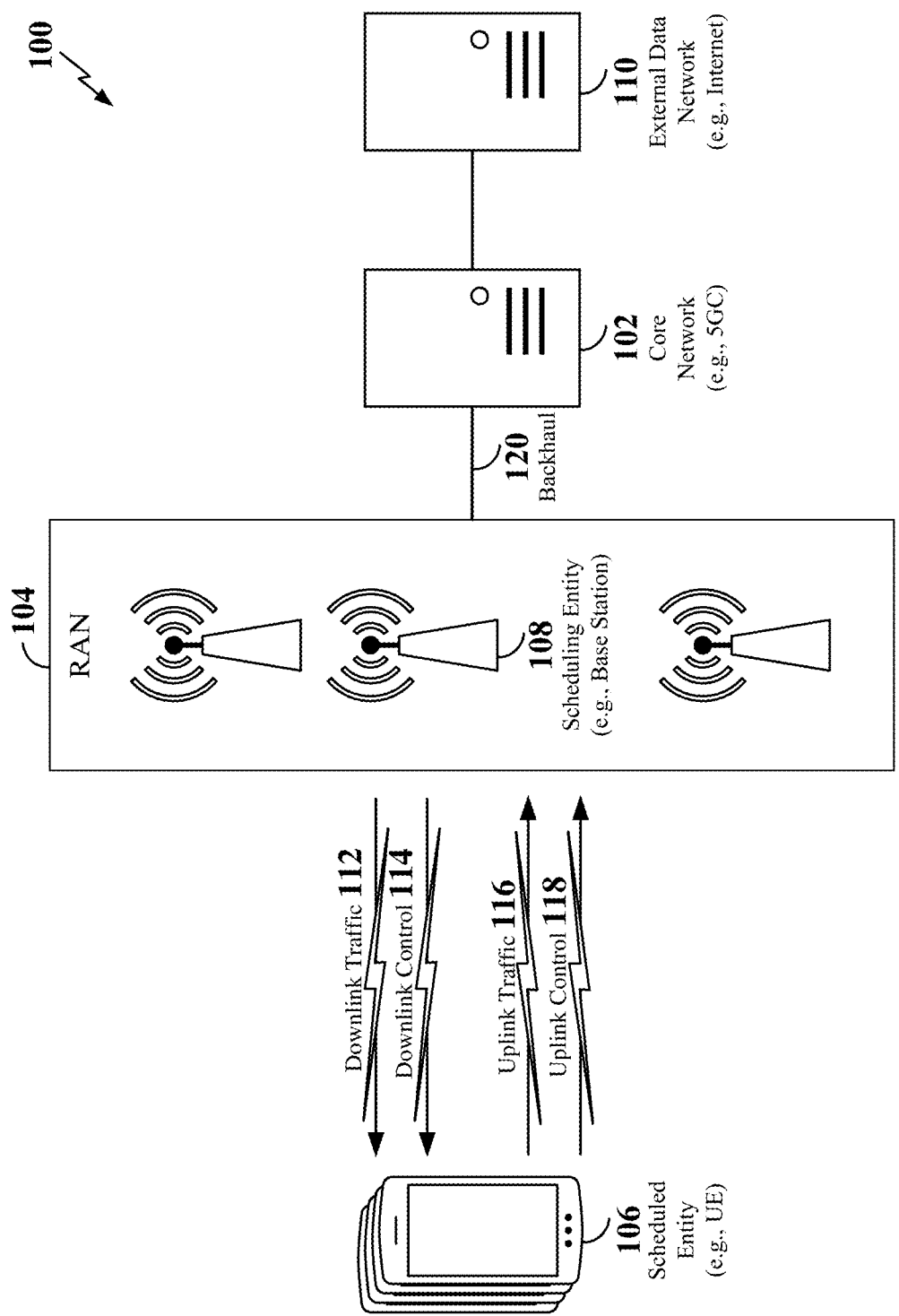
FIG. 1 is a schematic illustration of a wireless communication system according to some aspects of the disclosure.

The various concepts presented throughout this disclosure may be implemented across a broad variety of telecommunication systems, network architectures, and communication standards. Referring now to FIG. 1, as an illustrative example without limitation, various aspects of the present disclosure are illustrated with reference to a wireless communication system 100. The wireless communication system 100 includes three interacting domains: a core network 102, a radio access network (RAN) 104, and a user equipment (UE) 106. By virtue of the wireless communication system 100, the UE 106 may be enabled to carry out data communication with an external data network 110, such as (but not limited to) the Internet or an Ethernet network.

The RAN 104 may implement any suitable wireless communication technology or technologies to provide radio access to the UE 106. As one example, the RAN 104 may operate according to $3^{rd}$ Generation Partnership Project (3GPP) New Radio (NR) specifications, often referred to as 5G. As another example, the RAN 104 may operate under a hybrid of 5G NR and Evolved Universal Terrestrial Radio Access Network (eUTRAN) standards, often referred to as LTE. The 3GPP refers to this hybrid RAN as a next-generation RAN, or NG-RAN. Of course, many other examples may be utilized within the scope of the present disclosure.

As illustrated, the RAN 104 includes a plurality of base stations 108. Broadly, a base station is a network element in a radio access network responsible for radio transmission and reception in one or more cells to or from a UE. In different technologies, standards, or contexts, a base station may variously be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNode B (gNB), or some other suitable terminology.

The radio access network 104 is further illustrated supporting wireless communication for multiple mobile apparatuses. A mobile apparatus may be referred to as user equipment (UE) in 3GPP standards, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE may be an apparatus that provides a user with access to network services.

Within the present document, a "mobile" apparatus need not necessarily have a capability to move, and may be stationary. The term mobile apparatus or mobile device broadly refers to a diverse array of devices and technologies. UEs may include a number of hardware structural components sized, shaped, and arranged to help in communication; such components can include antennas, antenna arrays, RF chains, amplifiers, one or more processors, etc. electrically coupled to each other. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of Things" (IoT). A mobile apparatus may additionally be an automotive or other transportation vehicle, a remote sensor or actuator, a robot or robotics device, a satellite radio, a global positioning system (GPS) device, an object tracking device, a drone, a multi-copter, a quad-copter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc.; an industrial automation and enterprise device; a logistics controller; agricultural equipment; military defense equipment, vehicles, aircraft, ships, and weaponry, etc. Still further, a mobile apparatus may provide for connected medicine or telemedicine support, i.e., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant QoS for transport of critical service data.

Wireless communication between a RAN 104 and a UE 106 may be described as utilizing an air interface. Transmissions over the air interface from a base station (e.g., base station 108) to one or more UEs (e.g., UE 106) may be referred to as downlink (DL) transmission. In accordance with certain aspects of the present disclosure, the term downlink may refer to a point-to-multipoint transmission originating at a scheduling entity (described further below; e.g., base station 108). Another way to describe this scheme may be to use the term broadcast channel multiplexing. Transmissions from a UE (e.g., UE 106) to a base station (e.g., base station 108) may be referred to as uplink (UL) transmissions. In accordance with further aspects of the present disclosure, the term uplink may refer to a point-to-point transmission originating at a scheduled entity (described further below; e.g., UE 106).

In some examples, access to the air interface may be scheduled, wherein a scheduling entity (e.g., a base station 108) allocates resources for communication among some or all devices and equipment within its service area or cell. Within the present disclosure, as discussed further below, the scheduling entity may be responsible for scheduling, assigning, reconfiguring, and releasing resources for one or more scheduled entities. That is, for scheduled communication, UEs 106, which may be scheduled entities, may utilize resources allocated by the scheduling entity 108.

Base stations 108 are not the only entities that may function as scheduling entities. That is, in some examples, a UE may function as a scheduling entity, scheduling resources for one or more scheduled entities (e.g., one or more other UEs).

As illustrated in FIG. 1, a scheduling entity 108 may broadcast downlink traffic 112 to one or more scheduled entities 106. Broadly, the scheduling entity 108 is a node or device responsible for scheduling traffic in a wireless communication network, including the downlink traffic 112 and, in some examples, uplink traffic 116 from one or more scheduled entities 106 to the scheduling entity 108. On the other hand, the scheduled entity 106 is a node or device that receives downlink control information 114, including but not limited to scheduling information (e.g., a grant), synchronization or timing information, or other control information from another entity in the wireless communication network such as the scheduling entity 108.

In addition, the uplink and/or downlink control information and/or traffic information may be time-divided into frames, subframes, slots, and/or symbols. As used herein, a symbol may refer to a unit of time that, in an orthogonal frequency division multiplexed (OFDM) waveform, carries one resource element (RE) per sub-carrier. A slot may carry 7 or 14 OFDM symbols. A subframe may refer to a duration of 1 ms. Multiple subframes or slots may be grouped together to form a single frame or radio frame. Of course, these definitions are not required, and any suitable scheme for organizing waveforms may be utilized, and various time divisions of the waveform may have any suitable duration.

In general, base stations 108 may include a backhaul interface for communication with a backhaul portion 120 of the wireless communication system. The backhaul 120 may provide a link between a base station 108 and the core network 102. Further, in some examples, a backhaul network may provide interconnection between the respective base stations 108. Various types of backhaul interfaces may be employed, such as a direct physical connection, a virtual network, or the like using any suitable transport network.

The core network 102 may be a part of the wireless communication system 100, and may be independent of the radio access technology used in the RAN 104. In some examples, the core network 102 may be configured according to 5G standards (e.g., 5GC). In other examples, the core network 102 may be configured according to a 4G evolved packet core (EPC), or any other suitable standard or configuration.

Figure 2:
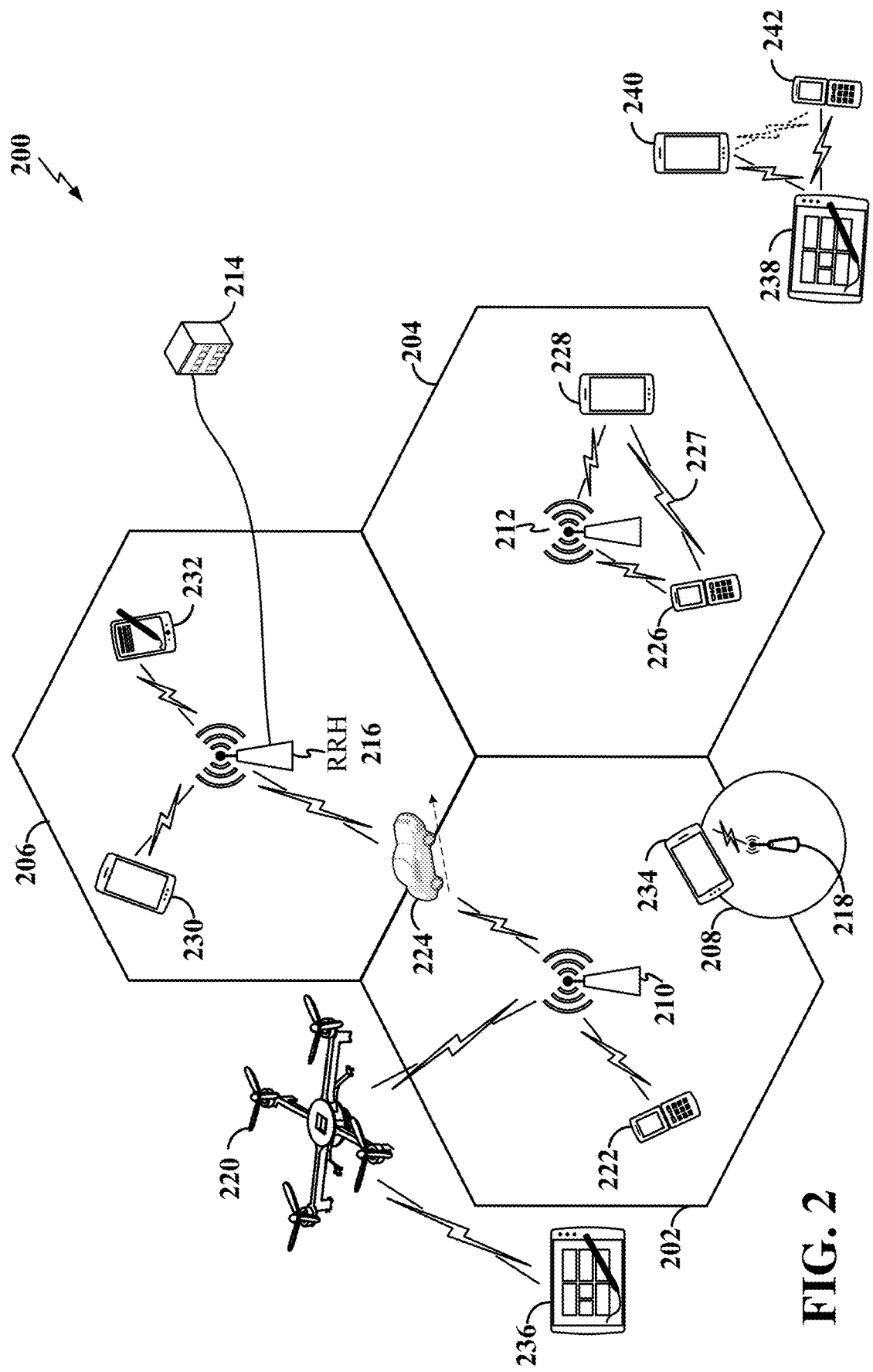
FIG. 2 is a conceptual illustration of an example of a radio access network according to some aspects of the disclosure.

Referring now to FIG. 2, by way of example and without limitation, a schematic illustration of a RAN 200 is provided. In some examples, the RAN 200 may be the same as the RAN 104 described above and illustrated in FIG. 1. The geographic area covered by the RAN 200 may be divided into cellular regions (cells) that can be uniquely identified by a user equipment (UE) based on an identification broadcasted from one access point or base station. FIG. 2 illustrates macrocells 202, 204, and 206, and a small cell 208, each of which may include one or more sectors (not shown). A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

Various base station arrangements can be utilized. For example, in FIG. 2, two base stations 210 and 212 are shown in cells 202 and 204; and a third base station 214 is shown controlling a remote radio head (RRH) 216 in cell 206. That is, a base station can have an integrated antenna or can be connected to an antenna or RRH by feeder cables. In the illustrated example, the cells 202, 204, and 206 may be referred to as macrocells, as the base stations 210, 212, and 214 support cells having a large size. Further, a base station 218 is shown in the small cell 208 (e.g., a microcell, picocell, femtocell, home base station, home Node B, home eNode B, etc.) which may overlap with one or more macrocells. In this example, the cell 208 may be referred to as a small cell, as the base station 218 supports a cell having a relatively small size. Cell sizing can be done according to system design as well as component constraints.

It is to be understood that the radio access network 200 may include any number of wireless base stations and cells. Further, a relay node may be deployed to extend the size or coverage area of a given cell. The base stations 210, 212, 214, 218 provide wireless access points to a core network for any number of mobile apparatuses. In some examples, the base stations 210, 212, 214, and/or 218 may be the same as the base station/scheduling entity 108 described above and illustrated in FIG. 1.

Within the RAN 200, the cells may include UEs that may be in communication with one or more sectors of each cell. Further, each base station 210, 212, 214, and 218 may be configured to provide an access point to a core network (e.g., as illustrated in FIG. 1) for all the UEs in the respective cells. For example, UEs 222 and 224 may be in communication with base station 210; UEs 226 and 228 may be in communication with base station 212; UEs 230 and 232 may be in communication with base station 214 by way of RRH 216; and UE 234 may be in communication with base station 218. In some examples, the UEs 222, 224, 226, 228, 230, 232, 234, 238, 240, and/or 242 may be the same as the UE/scheduled entity 106 described above and illustrated in FIG. 1.

In some examples, an unmanned aerial vehicle (UAV) 220, which may be a drone or quadcopter, can be a mobile network node and may be configured to function as a UE. For example, the UAV 220 may operate within cell 202 by communicating with base station 210.

In a further aspect of the RAN 200, sidelink signals may be used between UEs without necessarily relying on scheduling or control information from a base station. For example, two or more UEs (e.g., UEs 226 and 228) may communicate with each other using peer to peer (P2P) or sidelink signals 227 without relaying that communication through a base station (e.g., base station 212). In a further example, UE 238 is illustrated communicating with UEs 240 and 242. Here, the UE 238 may function as a scheduling entity or a primary sidelink device, and UEs 240 and 242 may function as a scheduled entity or a non-primary (e.g., secondary) sidelink device. In still another example, a UE may function as a scheduling entity in a device-to-device (D2D), peer-to-peer (P2P), or vehicle-to-vehicle (V2V) network, and/or in a mesh network. In a mesh network example, UEs 240 and 242 may optionally communicate directly with one another in addition to communicating with the scheduling entity 238. Thus, in a wireless communication system with scheduled access to time—frequency resources and having a cellular configuration, a P2P configuration, or a mesh configuration, a scheduling entity and one or more scheduled entities may communicate utilizing the scheduled resources. In some examples, the sidelink signals 227 include sidelink traffic (e.g., a physical sidelink shared channel) and sidelink control (e.g., a physical sidelink control channel).

In the radio access network 200, the ability for a UE to communicate while moving, independent of its location, is referred to as mobility. The various physical channels between the UE and the radio access network are generally set up, maintained, and released under the control of an access and mobility management function (AMF). The AMF (not shown in FIG. 2) may include a security context management function (SCMF) that manages the security context for both the control plane and the user plane functionality, and a security anchor function (SEAF) that performs authentication.

A radio access network 200 may utilize DL-based mobility or UL-based mobility to enable mobility and handovers (i.e., the transfer of a UE's connection from one radio channel to another). In a network configured for DL-based mobility, during a call with a scheduling entity, or at any other time, a UE may monitor various parameters of the signal from its serving cell as well as various parameters of neighboring cells. Depending on the quality of these parameters, the UE may maintain communication with one or more of the neighboring cells. During this time, if the UE moves from one cell to another, or if signal quality from a neighboring cell exceeds that from the serving cell for a given amount of time, the UE may undertake a handoff or handover from the serving cell to the neighboring (target) cell. For example, UE 224 (illustrated as a vehicle, although any suitable form of UE may be used) may move from the geographic area corresponding to its serving cell 202 to the geographic area corresponding to a neighbor cell 206. When the signal strength or quality from the neighbor cell 206 exceeds that of its serving cell 202 for a given amount of time, the UE 224 may transmit a reporting message to its serving base station 210 indicating this condition. In response, the UE 224 may receive a handover command, and the UE may undergo a handover to the cell 206.

In a network configured for UL-based mobility, UL reference signals from each UE may be utilized by the network to select a serving cell for each UE. In some examples, the base stations 210, 212, and 214/216 may broadcast unified synchronization signals (e.g., unified Primary Synchronization Signals (PSSs), unified Secondary Synchronization Signals (SSSs) and unified Physical Broadcast Channels (PBCH)). The UEs 222, 224, 226, 228, 230, and 232 may receive the unified synchronization signals, derive the carrier frequency and slot timing from the synchronization signals, and in response to deriving timing, transmit an uplink pilot or reference signal. The uplink pilot signal transmitted by a UE (e.g., UE 224) may be concurrently received by two or more cells (e.g., base stations 210 and 214/216) within the radio access network 200. Each of the cells may measure a strength of the pilot signal, and the radio access network (e.g., one or more of the base stations 210 and 214/216 and/or a central node within the core network) may determine a serving cell for the UE 224. As the UE 224 moves through the radio access network 200, the network may continue to monitor the uplink pilot signal transmitted by the UE 224. When the signal strength or quality of the pilot signal measured by a neighboring cell exceeds that of the signal strength or quality measured by the serving cell, the network 200 may handover the UE 224 from the serving cell to the neighboring cell, with or without informing the UE 224.

Although the synchronization signal transmitted by the base stations 210, 212, and 214/216 may be unified, the synchronization signal may not identify a particular cell, but rather may identify a zone of multiple cells operating on the same frequency and/or with the same timing. The use of zones in 5G networks or other next generation communication networks enables the uplink-based mobility framework and improves the efficiency of both the UE and the network, since the number of mobility messages that need to be exchanged between the UE and the network may be reduced.

In various implementations, the air interface in the radio access network 200 may utilize licensed spectrum, unlicensed spectrum, or shared spectrum. Licensed spectrum provides for exclusive use of a portion of the spectrum, generally by virtue of a mobile network operator purchasing a license from a government regulatory body. Unlicensed spectrum provides for shared use of a portion of the spectrum without need for a government-granted license. While compliance with some technical rules is generally still required to access unlicensed spectrum, generally, any operator or device may gain access. Shared spectrum may fall between licensed and unlicensed spectrum, wherein technical rules or limitations may be required to access the spectrum, but the spectrum may still be shared by multiple operators and/or multiple RATs. For example, the holder of a license for a portion of licensed spectrum may provide licensed shared access (LSA) to share that spectrum with other parties, e.g., with suitable licensee-determined conditions to gain access.

The air interface in the radio access network 200 may utilize one or more multiplexing and multiple access algorithms to enable simultaneous communication of the various devices. For example, 5G NR specifications provide multiple access for UL transmissions from UEs 222 and 224 to base station 210, and for multiplexing for DL transmissions from base station 210 to one or more UEs 222 and 224, utilizing orthogonal frequency division multiplexing (OFDM) with a cyclic prefix (CP). In addition, for UL transmissions, 5G NR specifications provide support for discrete Fourier transform-spread-OFDM (DFT-s-OFDM) with a CP (also referred to as single-carrier FDMA (SC-FDMA)). However, within the scope of the present disclosure, multiplexing and multiple access are not limited to the above schemes, and may be provided utilizing time division multiple access (TDMA), code division multiple access (CDMA), frequency division multiple access (FDMA), sparse code multiple access (SCMA), resource spread multiple access (RSMA), or other suitable multiple access schemes. Further, multiplexing DL transmissions from the base station 210 to UEs 222 and 224 may be provided utilizing time division multiplexing (TDM), code division multiplexing (CDM), frequency division multiplexing (FDM), orthogonal frequency division multiplexing (OFDM), sparse code multiplexing (SCM), or other suitable multiplexing schemes.

The air interface in the radio access network 200 may further utilize one or more duplexing algorithms. Duplex refers to a point-to-point communication link where both endpoints can communicate with one another in both directions. Full duplex means both endpoints can simultaneously communicate with one another. Half duplex means only one endpoint can send information to the other at a time. In a wireless link, a full duplex channel generally relies on physical isolation of a transmitter and receiver, and suitable interference cancelation technologies. Full duplex emulation is frequently implemented for wireless links by utilizing frequency division duplex (FDD) or time division duplex (TDD). In FDD, transmissions in different directions operate at different carrier frequencies. In TDD, transmissions in different directions on a given channel are separated from one another using time division multiplexing. That is, at some times the channel is dedicated for transmissions in one direction, while at other times the channel is dedicated for transmissions in the other direction, where the direction may change very rapidly, e.g., several times per slot.

Figure 3:
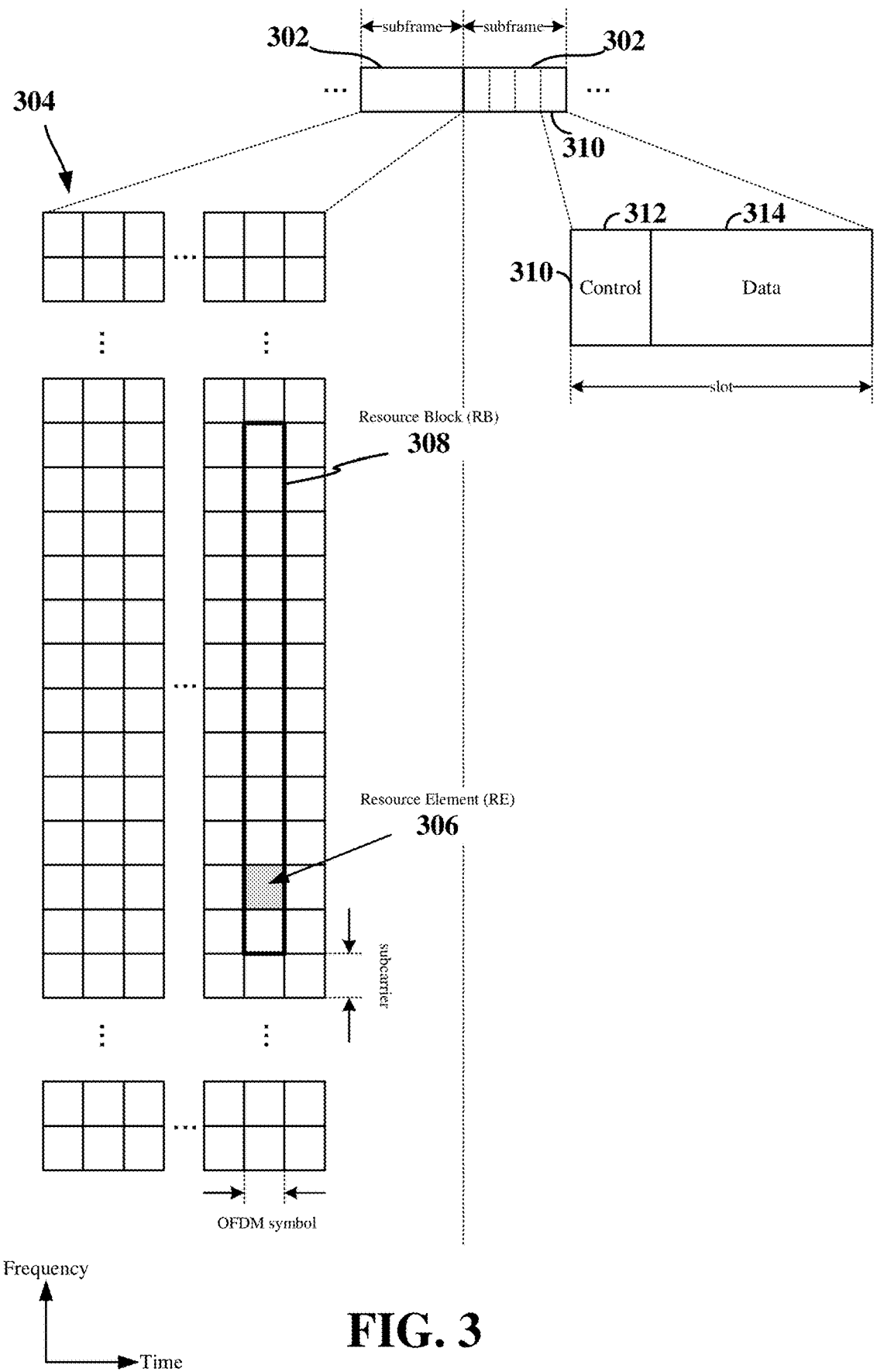
FIG. 3 is a schematic illustration of wireless resources in an air interface utilizing orthogonal frequency divisional multiplexing (OFDM) according to some aspects of the disclosure.

Various aspects of the present disclosure will be described with reference to an OFDM waveform, an example of which is schematically illustrated in FIG. 3. It should be understood by those of ordinary skill in the art that the various aspects of the present disclosure may be applied to an SC-FDMA waveform in substantially the same way as described herein below. That is, while some examples of the present disclosure may focus on an OFDM link for clarity, it should be understood that the same principles may be applied as well to SC-FDMA waveforms.

Referring now to FIG. 3, an expanded view of an example DL subframe (SF) 302 is illustrated, showing an OFDM resource grid. However, as those skilled in the art will readily appreciate, the PHY transmission structure for any particular application may vary from the example described here, depending on any number of factors. Here, time is in the horizontal direction with units of OFDM symbols; and frequency is in the vertical direction with units of subcarriers.

The resource grid 304 may be used to schematically represent time—frequency resources for a given antenna port. That is, in a multiple-input-multiple-output (MIMO) implementation with multiple antenna ports available, a corresponding multiple number of resource grids 304 may be available for communication. The resource grid 304 is divided into multiple resource elements (REs) 306. An RE, which is 1 subcarrier×1 symbol, is the smallest discrete part of the time-frequency grid, and contains a single complex value representing data from a physical channel or signal. Depending on the modulation utilized in a particular implementation, each RE may represent one or more bits of information. In some examples, a block of REs may be referred to as a physical resource block (PRB) or more simply a resource block (RB) 308, which contains any suitable number of consecutive subcarriers in the frequency domain In one example, an RB may include 12 subcarriers, a number independent of the numerology used. In some examples, depending on the numerology, an RB may include any suitable number of consecutive OFDM symbols in the time domain Within the present disclosure, it is assumed that a single RB such as the RB 308 entirely corresponds to a single direction of communication (either transmission or reception for a given device).

Scheduling of UEs (e.g., scheduled entities) for downlink or uplink transmissions typically involves scheduling one or more resource elements 306 within one or more bandwidth parts (BWPs), where each BWP includes two or more contiguous or consecutive RBs. Thus, a UE generally utilizes only a subset of the resource grid 304. In some examples, an RB may be the smallest unit of resources that can be allocated to a UE. Thus, the more RBs scheduled for a UE, and the higher the modulation scheme chosen for the air interface, the higher the data rate for the UE.

In this illustration, the RB 308 is shown as occupying less than the entire bandwidth of the subframe 302, with some subcarriers illustrated above and below the RB 308. In a given implementation, the subframe 302 may have a bandwidth corresponding to any number of one or more RBs 308. Further, in this illustration, the RB 308 is shown as occupying less than the entire duration of the subframe 302, although this is merely one possible example.

Each 1 ms subframe 302 may consist of one or multiple adjacent slots. In the example shown in FIG. 3, one subframe 302 includes four slots 310, as an illustrative example. In some examples, a slot may be defined according to a specified number of OFDM symbols with a given cyclic prefix (CP) length. For example, a slot may include 7 or 14 OFDM symbols with a nominal CP. Additional examples may include mini-slots having a shorter duration (e.g., one or two OFDM symbols). These mini-slots may in some cases be transmitted occupying resources scheduled for ongoing slot transmissions for the same or for different UEs.

An expanded view of one of the slots 310 illustrates the slot 310 including a control region 312 and a data region 314. In general, the control region 312 may carry control channels (e.g., PDCCH), and the data region 314 may carry data channels (e.g., PDSCH or PUSCH). Of course, a slot may contain all DL, all UL, or at least one DL portion and at least one UL portion. The simple structure illustrated in FIG. 3 is merely exemplary in nature, and different slot structures may be utilized, and may include one or more of each of the control region(s) and data region(s).

Although not illustrated in FIG. 3, the various REs 306 within a RB 308 may be scheduled to carry one or more physical channels, including control channels, shared channels, data channels, etc. Other REs 306 within the RB 308 may also carry pilots or reference signals, including but not limited to a demodulation reference signal (DMRS) or a sounding reference signal (SRS). These pilots or reference signals may provide for a receiving device to perform channel estimation of the corresponding channel, which may enable coherent demodulation/detection of the control and/or data channels within the RB 308.

In a DL transmission, the transmitting device (e.g., the scheduling entity) may allocate one or more REs 306 (e.g., within a control region 312) to carry DL control information including one or more DL control channels, such as a PBCH; a physical control format indicator channel (PCFICH); a physical hybrid automatic repeat request (HARQ) indicator channel (PHICH); and/or a physical downlink control channel (PDCCH), etc., to one or more scheduled entities. The transmitting device may further allocate one or more REs 306 to carry other DL signals, such as a DMRS; a phase-tracking reference signal (PT-RS); a channel state information—reference signal (CSI-RS); a primary synchronization signal (PSS); and a secondary synchronization signal (SSS).

The synchronization signals PSS and SSS, and in some examples, the PBCH and a PBCH DMRS, may be transmitted in a synchronization signal block (SSB) that includes 3 consecutive OFDM symbols, numbered via a time index in increasing order from 0 to 3. In the frequency domain, the SSB may extend over 240 contiguous subcarriers, with the subcarriers being numbered via a frequency index in increasing order from 0 to 239. Of course, the present disclosure is not limited to this specific SSB configuration. Other nonlimiting examples may utilize greater or fewer than two synchronization signals; may include one or more supplemental channels in addition to the PBCH; may omit a PBCH; and/or may utilize a different number of symbols and/or nonconsecutive symbols for an SSB, within the scope of the present disclosure.

The PCFICH provides information to assist a receiving device in receiving and decoding the PDCCH. The PDCCH carries downlink control information (DCI) including but not limited to power control commands, scheduling information, a grant, and/or an assignment of REs for DL and UL transmissions. The PHICH carries HARQ feedback transmissions such as an acknowledgment (ACK) or negative acknowledgment (NACK). HARQ is a technique well-known to those of ordinary skill in the art, wherein the integrity of packet transmissions may be checked at the receiving side for accuracy, e.g., utilizing any suitable integrity checking mechanism, such as a checksum or a cyclic redundancy check (CRC). If the integrity of the transmission confirmed, an ACK may be transmitted, whereas if not confirmed, a NACK may be transmitted. In response to a NACK, the transmitting device may send a HARQ retransmission, which may implement chase combining, incremental redundancy, etc.

In an UL transmission, the transmitting device (e.g., the scheduled entity) may utilize one or more REs 306 to carry UL control information including one or more UL control channels, such as a physical uplink control channel (PUCCH), to the scheduling entity. UL control information may include a variety of packet types and categories, including pilots, reference signals, and information configured to enable or assist in decoding uplink data transmissions. For example, the UL control information may include a DMRS or SRS. In some examples, the control information may include a scheduling request (SR), i.e., request for the scheduling entity to schedule uplink transmissions. Here, in response to the SR transmitted on the control channel, the scheduling entity may transmit downlink control information that may schedule resources for uplink packet transmissions. UL control information may also include HARQ feedback, channel state feedback (CSF), or any other suitable UL control information.

In addition to control information, one or more REs 306 (e.g., within the data region 314) may be allocated for user data or traffic data. Such traffic may be carried on one or more traffic channels, such as, for a DL transmission, a PDSCH; or for an UL transmission, a physical uplink shared channel (PUSCH). In some examples, one or more REs 306 within the data region 314 may be configured to carry SIBs (e.g., SIB1), carrying system information that may enable access to a given cell.

These physical channels described above are generally multiplexed and mapped to transport channels for handling at the medium access control (MAC) layer. Transport channels carry blocks of information called transport blocks (TB). The transport block size (TBS), which may correspond to a number of bits of information, may be a controlled parameter, based on the modulation and coding scheme (MCS) and the number of RBs in a given transmission.

The channels or carriers described above with reference to FIGS. 1-3 are not necessarily all of the channels or carriers that may be utilized between a scheduling entity and scheduled entities, and those of ordinary skill in the art will recognize that other channels or carriers may be utilized in addition to those illustrated, such as other traffic, control, and feedback channels.

As discussed above, a BS may schedule uplink transmissions for UEs, specifying which time-domain and frequency-domain resources each UE is to use for its respective uplink transmission. In some scenarios, the uplink transmissions by different UEs may carry different types of traffic (e.g., with different requirements). For example, a transmission by a first UE may be a regular traffic transmission, while a transmission by a second UE may be for traffic having stricter latency requirements and/or reliability requirements. For example, the transmission by the second UE may be for enhanced ultra-reliable low latency communication (eURLLC). These different types of traffic may be associated with different priorities. For example, eURLLC traffic may have a higher priority than regular traffic.

In some cases, after scheduling a first uplink transmission for a first UE, a BS may determine that a second, higher priority, uplink transmission for a second UE needs to be scheduled. However, there might not be sufficient resources available for the second transmission. For example, the second transmission may have very strict latency requirement such that the second transmission cannot be delayed. In this case, the BS may elect to cancel the first transmission so that the BS can schedule for the second transmission one or more of the resources originally allocated for the first transmission.

A BS may use an uplink cancelation indication (UL CI) to instruct a UE to cancel a previously scheduled transmission. In some examples, the UL CI (hereafter referred to simply as CI for convenience) may take the form of downlink control information (DCI) format 2_4 signaling. That is, a BS may send a DCI format 2_4 to a UE to signal the UE to cancel a previously scheduled uplink transmission such as a PUSCH transmission or an SRS transmission.

A UE that detects a DCI format 2_4 from a serving cell may determine, for a scheduled PUSCH transmission (or a repetition of a PUSCH transmission if the PUSCH transmission is with repetitions), whether the DCI format 2_4 identifies a resource of the PUSCH transmission (or the repetition of the PUSCH transmission). For example, the UE may determine whether a group of symbols, from a set of symbols (e.g., designated $T_{CI}$ symbols) in the DCI format 2_4, has a corresponding bit value of '1' and whether that group of symbols includes a symbol of the PUSCH transmission (or the repetition of the PUSCH transmission). In addition, the UE may determine whether a group of PRBs, from a set of PRBs (e.g., designated $B_{CI}$ PRBs) in the DCI format 2_4, has a corresponding bit value of '1' and includes a PRB of the PUSCH transmission (or the repetition of the PUSCH transmission).

If these two conditions are met, the UE may cancel the scheduled PUSCH transmission (or the repetition of the PUSCH transmission). In some examples, the cancelation of a PUSCH transmission (or the repetition of the PUSCH transmission) may include all symbols from the earliest symbol of the PUSCH transmission (or the repetition of the PUSCH transmission) that are in one or more groups of symbols having corresponding bit values of '1' in the DCI format 2_4.

Similarly, a UE that detects a DCI format 2_4 from a serving cell may determine, for a scheduled SRS transmission, whether the DCI format 2_4 identifies a resource of the SRS transmission. For example, the UE may determine whether a group of symbols, from a set of symbols (e.g., designated $T_{CI}$ symbols) in the DCI format 2_4, has a corresponding bit value of '1' and whether that group of symbols includes a symbol of the SRS transmission. In addition, the UE may determine whether a group of PRBs, from a set of PRBs (e.g., designated $B_{CI}$ PRBs) in the DCI format 2_4, has a corresponding bit value of '1' and includes a PRB of the SRS transmission.

If these two conditions are met, the UE may cancel the scheduled SRS transmission. In some examples, the cancelation of an SRS transmission may include symbols that are in one or more groups of symbols having corresponding bit values of '1' in the DCI format 2_4.

In some examples, the parameters for a CI such as DCI format 2_4 may include a payload size of the CI, a time duration for the CI, a time granularity for the CI, and a frequency region for the CI. A BS may configure a UE with these parameters using a radio resource control (RRC) message or some other suitable type of signaling.

In some examples, the payload size of the CI may be the number of bits for the cancelation indicator for the cell. In some examples, the CI payload size may be an RRC parameter CI-PayloadSize, designated, $N_{CI}$. The length of the DCI may controlled by a separate RRC parameter dci-PayloadSize-forCI.

In some examples, the time duration for the CI may start a defined period of time (e.g., a defined number of symbols) after the PDCCH including the CI is received (e.g., the time duration starts from N2 after PDCCH). In some examples, the CI payload size may be an RRC parameter timedurationforCI, designated, $T_{CI}$.

In some examples, the time granularity for the CI may indicate the number of partitions within the time duration for the CI. In some examples, the time granularity for the CI may be any of the values {1,2,4,7,14,28}. Other values may be used in other examples. In some examples, the time granularity for the CI may be an RRC parameter timeGranularityforCI, designated, $G_{CI}$.

In some examples, the frequency region for the CI may be resource indication value (RIV) indication configured by an RRC message. In some example, the frequency region for the CI may be a value within a value range of 0 ... 37949. Other values may be used in other examples. In some examples, the frequency region for the CI may be configured in a similar manner as an information element (IE) "locationAndBandwidth" that is used for configuring a BWP. The configuration of the frequency region for the CI may be per-serving cell specific. A reference point for the frequency region may be derived based on the RRC parameter offsetToCarrier (e.g., derived in a similar manner as the BWP configuration). In some examples, the frequency region for the CI may be an RRC parameter frequencyRegionforCI.

Figure 4:
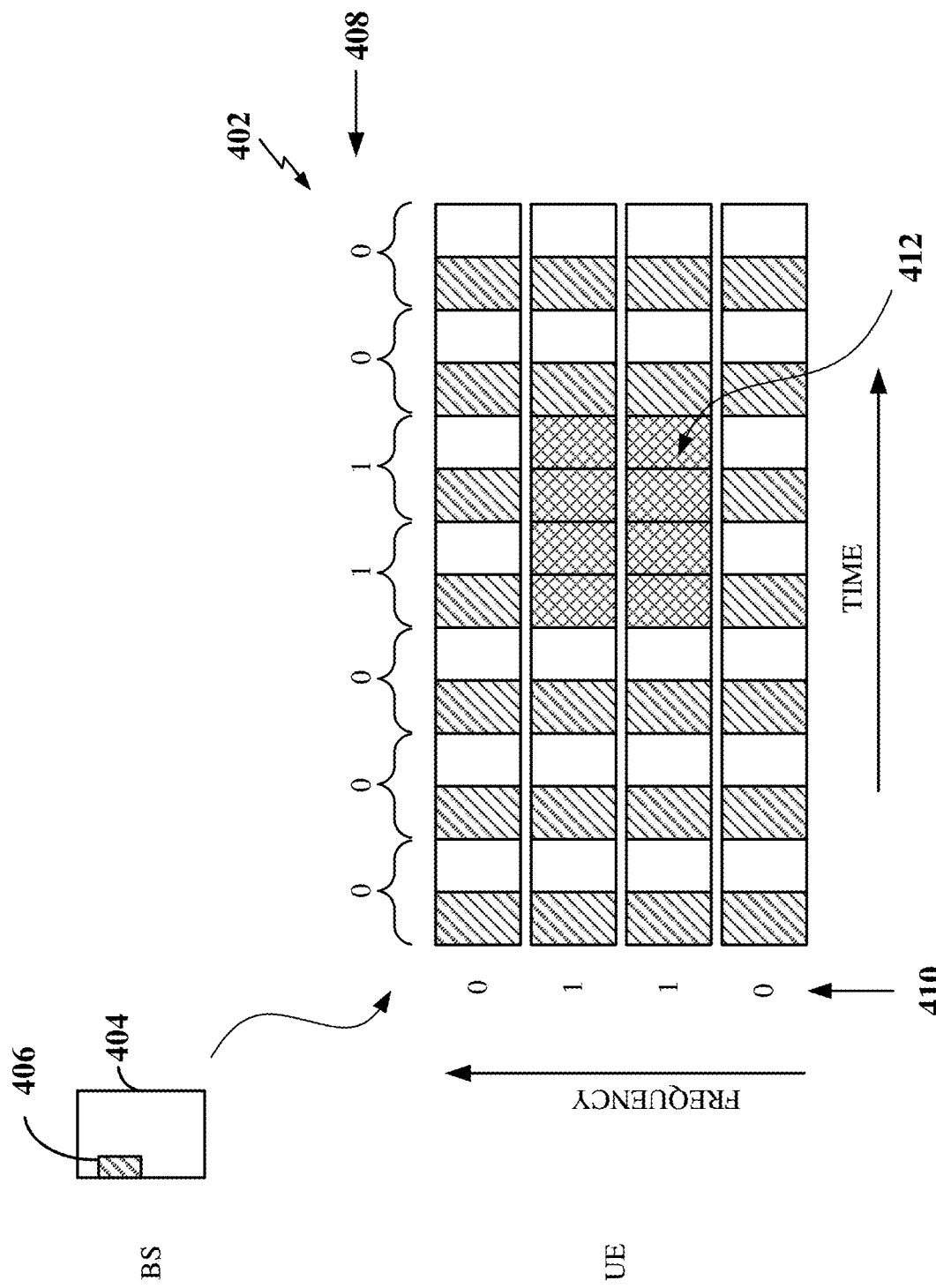
FIG. 4 is a conceptual illustration of an example of canceled uplink resources according to some aspects of the disclosure.

In some examples, a 2-D bitmap is used to indicate the resources being canceled by a CI. FIG. 4 illustrates an example of a 2-D bitmap 402 that may be used to indicate the resources for CI. Here, a BS sends DL information 404 including a CI 406 to a UE. The CI identifies time-domain resources (x-axis) and frequency domain resources (y-axis) subject to cancelation. Specifically, seven bits 408 of the CI indicate whether corresponding time resources are subject to cancelation, while four bits 410 of the CI indicate whether corresponding frequency resources are subject to cancelation. The resources subject to cancelation are indicated by the cross-hatched blocks (e.g., block 412) in the bitmap 402.

In the example of FIG. 4, the 2-D bitmap 402 includes M×N blocks (e.g., CI-PayloadSize=M×N). Here, M=$G_{CI}$, where the applicable symbols within $T_{CI}$ are grouped into $G_{CI}$ groups with approximately equal size per group. Thus, N=CI-PayloadSize/M. The parameter $N_{CI}$ may be used to refer to the set of symbols within timedurationforCI excluding synchronization signal block (SSB) symbols and semi-static downlink (DL) symbols. In the bitmap 402, CI-PayloadSize=28, timedurationforCI=timeGranularityforCI×2=14 OFDM symbols, timeGranularityforCI=7 groups, and frequencyRegionforCI=4 sub-bands (sub-bands=frequencyRegionforCI/4). Other bitmap parameters may be used in other examples.

As discussed above, a network may use unlicensed radio frequency (RF) spectrum in some scenarios. For example, a network operator may deploy cells that are configured to communicate on an unlicensed RF spectrum (e.g., in addition to cells operating on a licensed RF spectrum) to extend the coverage of the network or to provide additional services (e.g., higher throughput) to UEs operating under the network. NR operation in unlicensed RF spectrum may be referred to as NR-U.

For UL transmissions on unlicensed RF spectrum, interlaced-based scheduling may be used in the frequency domain For example, in NR-U, a PRB interlaced waveform may be used in the UL to satisfy occupied channel bandwidth (OCB) goals and/or to boost UL transmit power for a given power spectral density (PSD) limitation.

Figure 5:
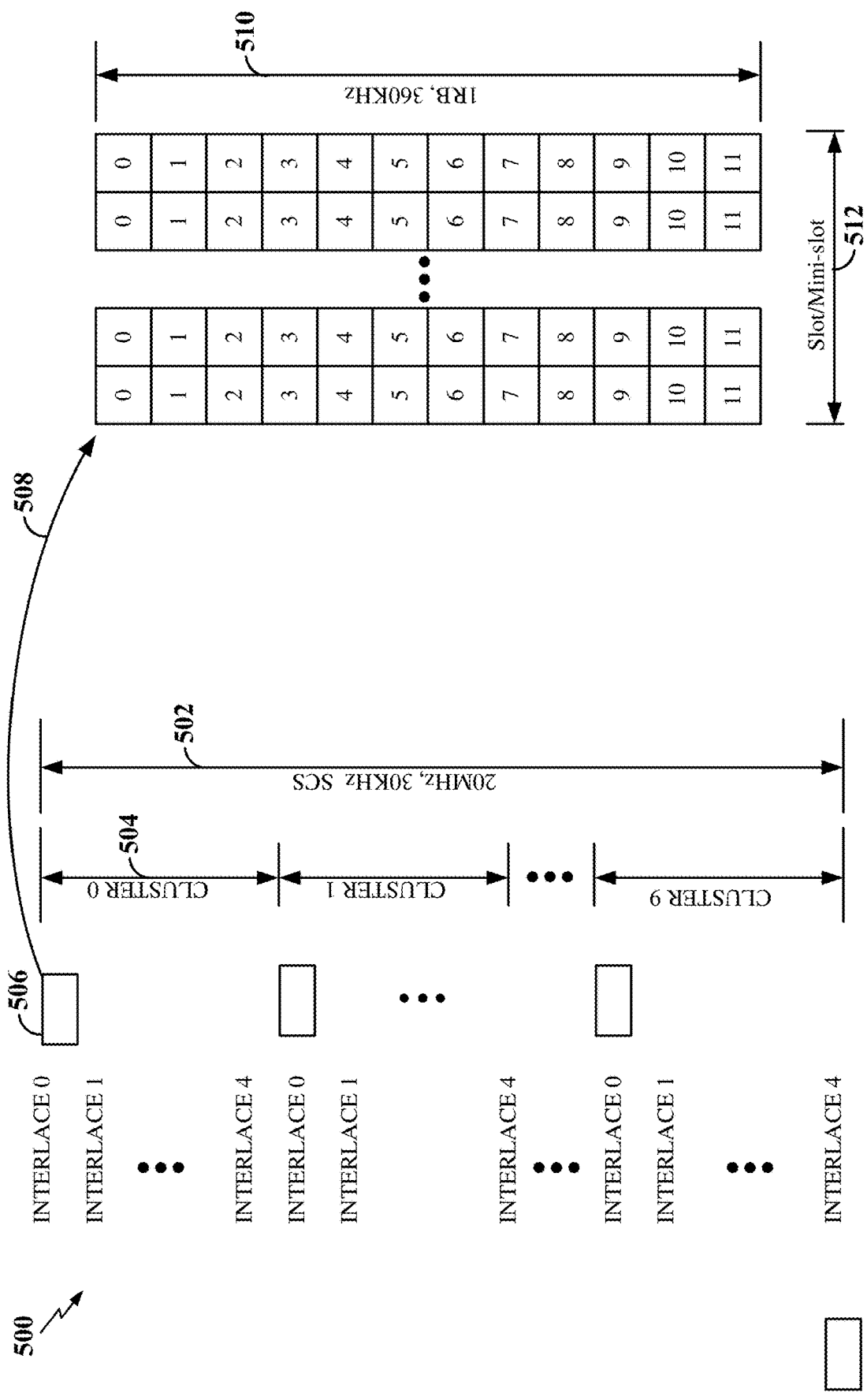
FIG. 5 is a conceptual illustration of an example of frequency domain interlaces according to some aspects of the disclosure.

FIG. 5 illustrates an example of UL interlaces 500 (e.g., for NR-U). In this example, a 20 MHz bandwidth 502 (e.g., for a 30 kHz sub-carrier spacing (SCS)) is divided into nine clusters (e.g., including cluster 0 504). A given interlace is repeated in each cluster. For example, interlace 0 is repeated in cluster 0, cluster 1, ... , cluster 9, while interlace 1 is repeated in cluster 0, cluster 1, ... , cluster 9, and so on.

A BS may schedule a UE to transmit according to one of more of the interlaces. For example, a BS may schedule a first UE to transmit on interlace 0 and schedule a second UE to transmit on interlace 1. As another example, a BS may schedule a first UE to transmit on interlace 0 and interlace 1. Other examples are possible.

A given interlace may correspond to a set of resources. For example, as indicated by the arrow 508, interlace 0 may correspond to a resource block 510 and a slot or mini-slot 512.

In some examples, for a given SCS, the PRB-based interlace design that follows may be supported for PUSCH and PUCCH. The same spacing (M) may be used between consecutive PRBs in an interlace for all interlaces regardless of carrier bandwidth (e.g., the number of PRBs per interlace may be dependent on the carrier bandwidth). Point A (e.g., a common reference point for RB grids) may be the reference for the interlace definition. For all bandwidths, the parameter M may correspond to 10 interlaces (M=10) for 15 kHz SCS, while the parameter M may correspond to 5 interlaces (M=5) for 30 kHz SCS.

In some examples, for interlace transmission of at least PUSCH and PUCCH, the PRB-based interlace design that follows may be supported for 20 MHz carrier bandwidth and 15 kHz SCS. The parameter M may correspond to 10 interlaces (M=10). The parameter N may correspond to 10 or 11 PRBs per interlace (N=10 or 11 PRBs/interlace). In addition, 6 bits may be used for to provide 55 combinations of continuous interlaces, along with 9 combinations of discontinuous interlaces.

In some examples, for interlace transmission of at least PUSCH and PUCCH, the PRB-based interlace design that follows may be supported for 20 MHz carrier bandwidth and 30 kHz SCS. The parameter M may correspond to 5 interlaces (M=5). The parameter N may correspond to 10 or 11 PRBs per interlace (N=10 or 11 PRBs/interlace). In addition, 5 bits may be used for 5 interlaces with a bitmap.

Comparing FIGS. 4 and 5, the contiguous resource bitmap defined by the CI of FIG. 4 may be inconsistent with the interlaced-based (e.g., noncontiguous) resource allocation of FIG. 5. Thus, in some aspects, the CI scheme of FIG. 4 might not work well for UL transmissions in unlicensed RF spectrum (e.g., NR-U UL). While the CI parameters for the time domain may be directly applicable to UL transmissions in unlicensed RF spectrum, given that an interlace and RB set structure may be used for UL resource allocation in unlicensed RF spectrum, the CI frequency domain parameters might not directly apply to UL transmissions in unlicensed RF spectrum.

The disclosure relates in some aspects to a CI that specifies parameters in the frequency domain for an UL transmission in unlicensed RF spectrum that uses an interlace and RB set structure. As discussed above, the allocated resources in this case may be indicated by a combination of interlace and RB sets.

Figure 6:
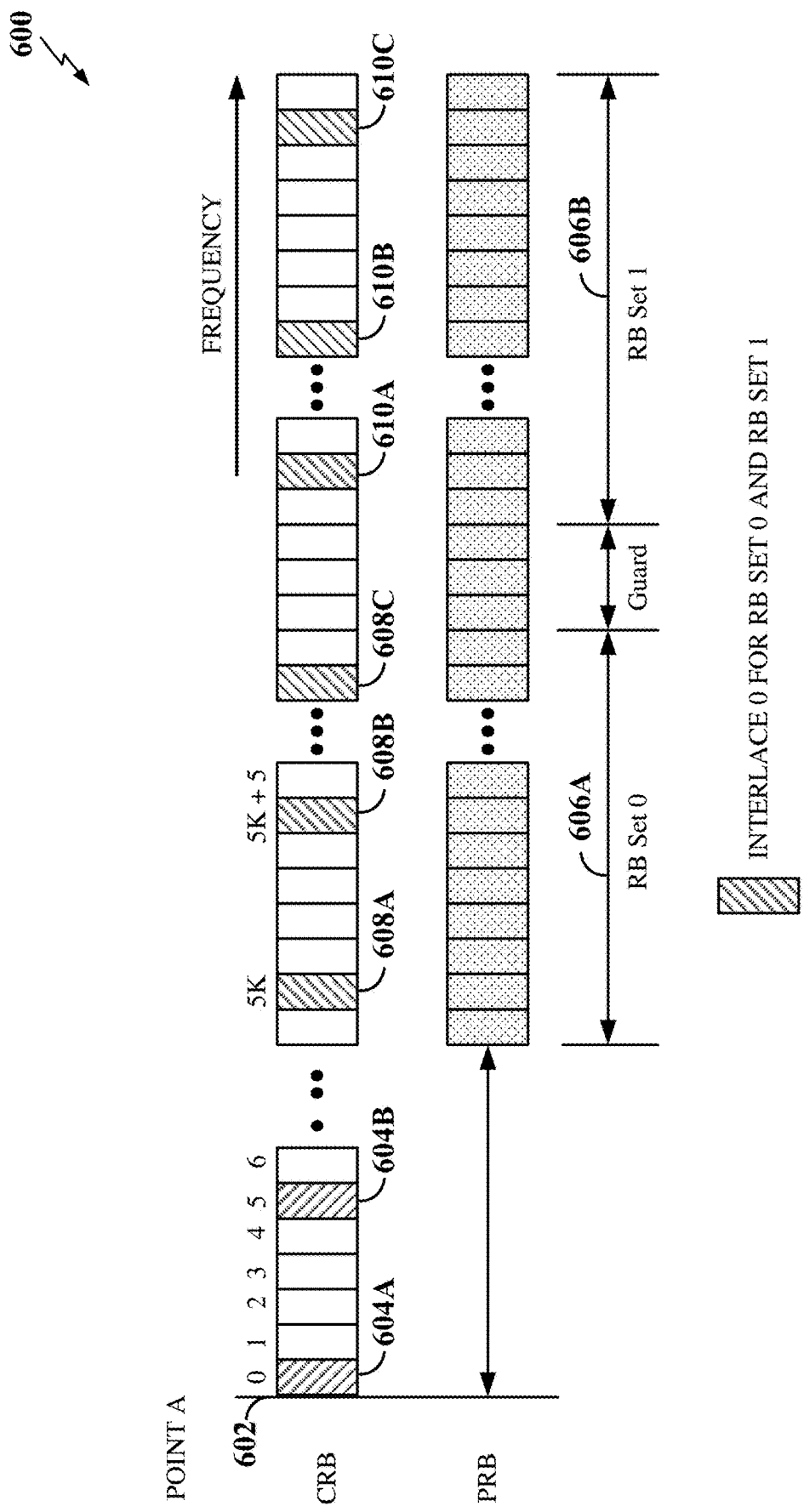
FIG. 6 is a conceptual illustration of an example of interlace and resource block (RB) set parameters for the frequency domain according to some aspects of the disclosure.

FIG. 6 illustrates an example of such a resource allocation 600. FIG. 6 illustrates a set of common resource blocks (CRBs) (which may also be referred to as carrier resource blocks) and a set of physical resource blocks (PRBs) referenced to a Point A 602. In the CRBs, five interlaces are applied across the whole band for 30 kHz SCS. For example, two instance of interlace 0 604A and 604B are shown for sub-bands 0 and 5, respectively.

In the PRBs (e.g., for a particular cell), an RB set 0 606A and an RB set 1 606B are allocated in this example. In addition, interlace 0 is allocated within the RB set 0 606A and the RB set 1 606B. For example, three instance of interlace 0 608A, 608B, and 608C are shown for the RB set 0 606A. In addition, three instance of interlace 0 610A, 610B, and 610C are shown for the RB set 1 606B In some examples, when a PRB interlaced waveform is used for an UL transmission, the bits of a CI (e.g., the frequency domain bits in the 2-D bitmap of CI) may be defined to indicate the RB set and interlace based definition for the transmission. For example, given a total of F bits for the frequency domain bitmap, and a quantity R for the number of RB sets (R RB sets) in a cell with X interlaces, the F bits may be used to indicate the interlace(s) and/or RB set(s) to be canceled.

Figure 7:
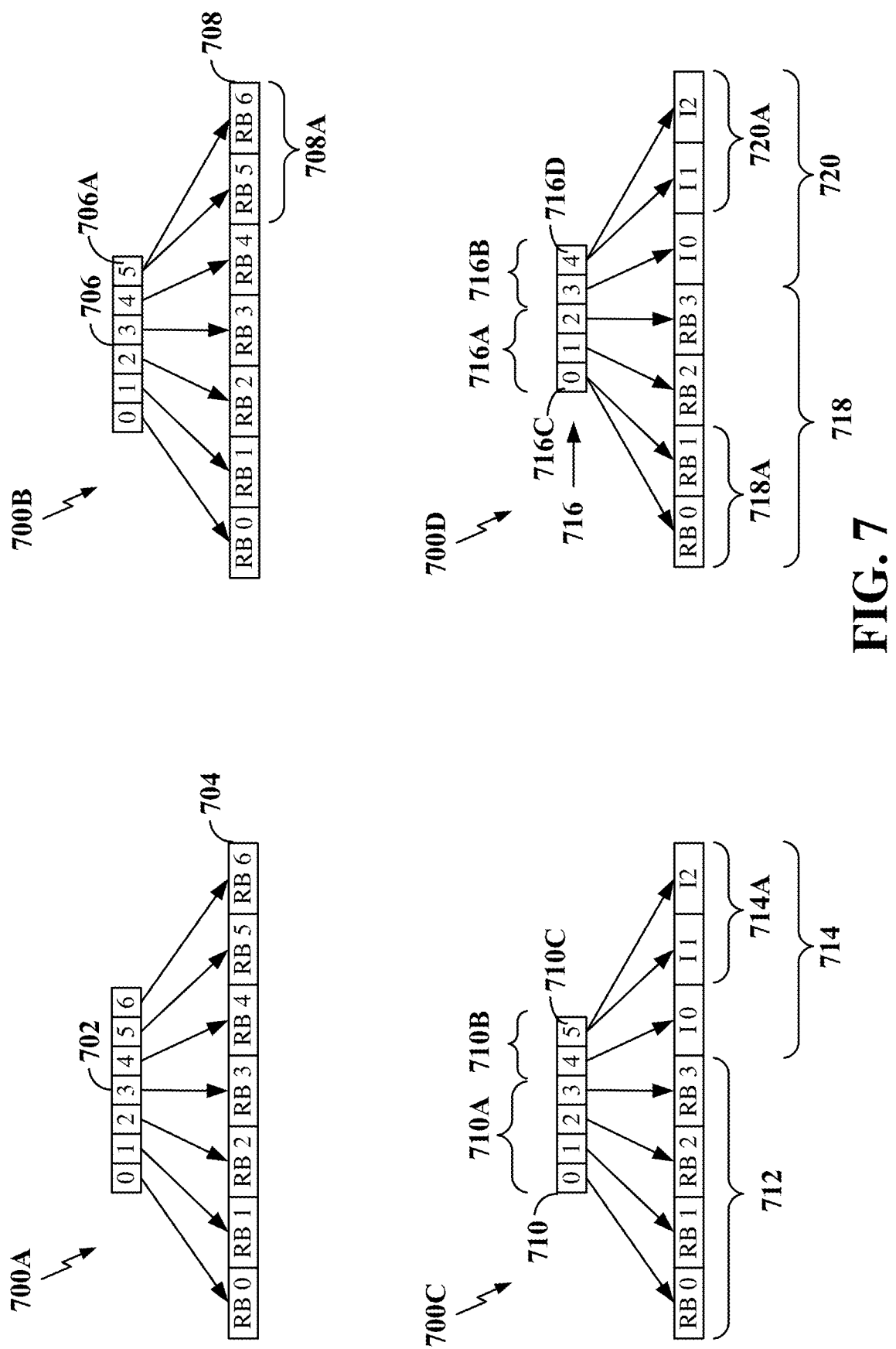
FIG. 7 is a conceptual illustration of examples of bit mapping operations according to some aspects of the disclosure.

In some examples, a mapping between the F bits and the R RB sets and X interlaces may be determined by a bit mapping operation that uses a formula, a table, or in some other mapping technique. For example, a table may map a given bit of the F bits to a particular RB set or a group of RB sets. Alternatively or in addition, the table may map a given bit of the F bits to particular interlace or a set of interlaces. FIG. 7 illustrates several example bit mapping scenarios.

A mapping 700A of FIG. 7 illustrates an example where the number of F bits 702 is equal to the number of RB sets 704. In a scenario where the identification of the canceled RB sets takes priority over the identification of the canceled interlaces, all of the F bits 702 may be used to indicate the RB sets 704 as shown.

A mapping 700B of FIG. 7 illustrates an example where the number of F bits 706 is less than the number of RB sets 708. In a scenario whether the identification of the canceled RB sets takes priority over the identification of the canceled interlaces, all of the F bits 706 may be used to indicate the RB sets 708 as shown. In this case, since the number of F bits 706 is less than the number of RB sets 708, at least one of the F bits 706A is used to indicate a group of RB sets 708A. Other mappings between the F bits 706 and the RBs sets 708 may be used in other examples.

A mapping 700C of FIG. 7 illustrates an example where the number of F bits 710 is greater that the number of RB sets 712. In a scenario whether the identification of the canceled RB sets takes priority over the identification of the canceled interlaces, a first set of the F bits 710A may be used to indicate the RB sets 712. In addition, a second set of the F bits 710B may be used to indicate the interlaces 714. If the number of F bits 710B in the second set is less than the number of interlaces 714, at least one of the F bits 710C of the second set may be used to indicate a group of interlaces 714A. Other mappings between the F bits 706 and the interlaces 714 may be used in other examples.

Mappings similar to the mappings 700A, 700B, and 700C could be applied for a scenario where the identification of the canceled interlaces takes priority over the identification of the canceled RB sets. In a first example (e.g., corresponding to the mapping 700A), all of the F bits may be used to indicate the interlaces in the case where the number of F bits is equal to the number of interlaces. In a second example (e.g., corresponding to the mapping 700B), all of the F bits may be used to indicate the interlaces in the case where the number of F bits is less to the number of interlaces. In this case, since the number of F bits is less than the number of interlaces, at least one of the F bits may be used to indicate a group of interlaces. In a third example (e.g., corresponding to the mapping 700C) where the number of F bits is greater than the number of interlaces, a first set of the F bits may be used to indicate the interlaces, while a second set of the F bits may be used to indicate the RB sets. In this case, if the number of F bits of the second set is less than the number of RB sets, at least one of the F bits of the second set may be used to indicate a group of RB sets.

A mapping 700D of FIG. 7 illustrates an example where the F bits 716 are split between the RB sets 718 and the interlaces 720. For example, a first set of the F bits 716A may be used to indicate the RB sets 718. In addition, a second set of the F bits 716B may be used to indicate the interlaces 720. If the number of F bits 716A in the first set is less than the number of RB sets 718, at least one of the F bits 716C of the first set may be used to indicate a group of RB sets 718A. If the number of F bits 716B in the second set is less than the number of interlaces 720, at least one of the F bits 716D of the second set may be used to indicate a group of interlaces 720A. Other mappings between the F bits 706 and the RB sets 718 and/or the interlaces 720 may be used in other examples.

As mentioned above, bit mapping operations may be performed using a formula. Three example formula options that may be used to group RB sets and interlaces to be represented by the F bits follow. Other formulas may be used in other examples.

In a first option, the formula set forth in Equations 1 and 2 prioritizes RB sets (e.g., if a limited number of bits is available, the bits are first used to indicate the RB sets). For example, the formula first allocates bits to RB sets, and if there are remaining bits, the formula allocates bits to interlaces.

If F<=R, use all F bits for the R RB sets. Initially,
the first F−R+⌊R/F⌋*F groups including ⌈R/F⌉
RB sets are specified. Then, the remaining
R−⌈R/F⌉*F groups including ⌊R/F⌋ RB sets are
specified.     Equation 1

If F>R, use R bits for the R RB sets and use F−R=C
bits for the interlaces. Initially, the first C−X+
⌊X/C⌋*C groups including ⌈X/C⌉ interlaces are
specified. Then, the remaining X−⌈X/C⌉*C
groups including ⌊X/C⌋ interlaces are specified.     Equation 2

Two examples of Equation 1 follow. In the first example, F=3 and R=6. In the second example, F=3 and R=5.

In the first example, for the first step, $F-R+\lfloor R/F \rfloor *F$ groups including $\lfloor R/F \rfloor$ RB sets corresponds to $3-6+\lfloor 6/3 \rfloor *3$ groups including $\lfloor 6/3 \rfloor$ RB sets. This equates to $3-6+2*3$ groups including 2 RB sets. Thus, there are three groups of RB sets, where each group includes two RB sets. Accordingly, the three F bits identify the six RB sets. Thus, there is no need to perform the second step of Equation 1 in this example.

In the second example, for the first step, $F-R+\lfloor R/F \rfloor *F$ groups including $\lfloor R/F \rfloor$ RB sets corresponds to $3-5+\lfloor 5/3 \rfloor *3$ groups including $\lfloor 5/3 \rfloor$ RB sets. This equates to $3-5+1*3$ groups including 1 RB sets. Thus, there is one group that includes one RB set. The second step of Equation 1 is then performed, $R-\lfloor R/F \rfloor *F$ groups including $\lceil R/F \rceil$ RB sets corresponds to $5-\lfloor 5/3 \rfloor *3$ groups including $\lceil 5/3 \rceil$ RB sets. This equates to $5-1*3$ groups including 2 RB sets. Thus, there are two groups that include two RB sets. Accordingly, the three F bits identify the five RB sets.

In a second option, the formula the formula set forth in Equations 3 and 4 prioritizes interlaces (e.g., if a limited number of bits is available, the bits are used to indicate the interlace). For example, the formula first allocates bits to interlaces, and if there are remaining bits, the formula allocates bit to RB sets.

If F<=X, use all of the F bits for the X interlaces. Initially, the first $F-X+\lfloor X/F \rfloor *$ F groups including $\lfloor X/F \rfloor$ interlaces are specified. Then, the remaining $X-\lfloor X/F \rfloor *$ F groups including $\lceil X/F \rceil$ interlaces are specified.   Equation 3

If F>X, use X bits for the interlaces and use F-X=C bits for the R RB sets. Initially, the first $C-R+\lfloor R/C \rfloor *$ C groups including $\lfloor R/C \rfloor$ RB sets are specified. Then, the remaining $R-\lfloor R/C \rfloor *$ C groups including $\lceil R/C \rceil$ RB sets are specified.   Equation 4

In a third option, the formula the formula set forth in Equations 5 and 6 defines a joint RB sets and interlaces bitmap as a function of the number of bits available. For example, F is split between interlaces and RB sets (e.g., F=Fx+Fr, where Fx bits are for the interlaces and Fr bits are for the RB sets).

Fx bits are used for the X interlaces. Initially, the first $Fx-X+\lfloor X/Fx \rfloor *$ Fx groups including $\lfloor X/Fx \rfloor$ interlaces are specified. Then, the remaining $X-\lfloor X/Fx \rfloor *$ Fx groups including $\lceil X/Fx \rceil$ interlaces are specified.   Equation 5

Fr bits are used for the R RB sets. Initially, the first $Fr-R+\lfloor R/Fr \rfloor *Fr$ groups including $\lfloor R/Fr \rfloor$ RB sets are specified. Then, the remaining $R-\lfloor R/Fr \rfloor *$ Fr groups including $\lceil R/Fr \rceil$ RB sets are specified.   Equation 6

Figure 8:
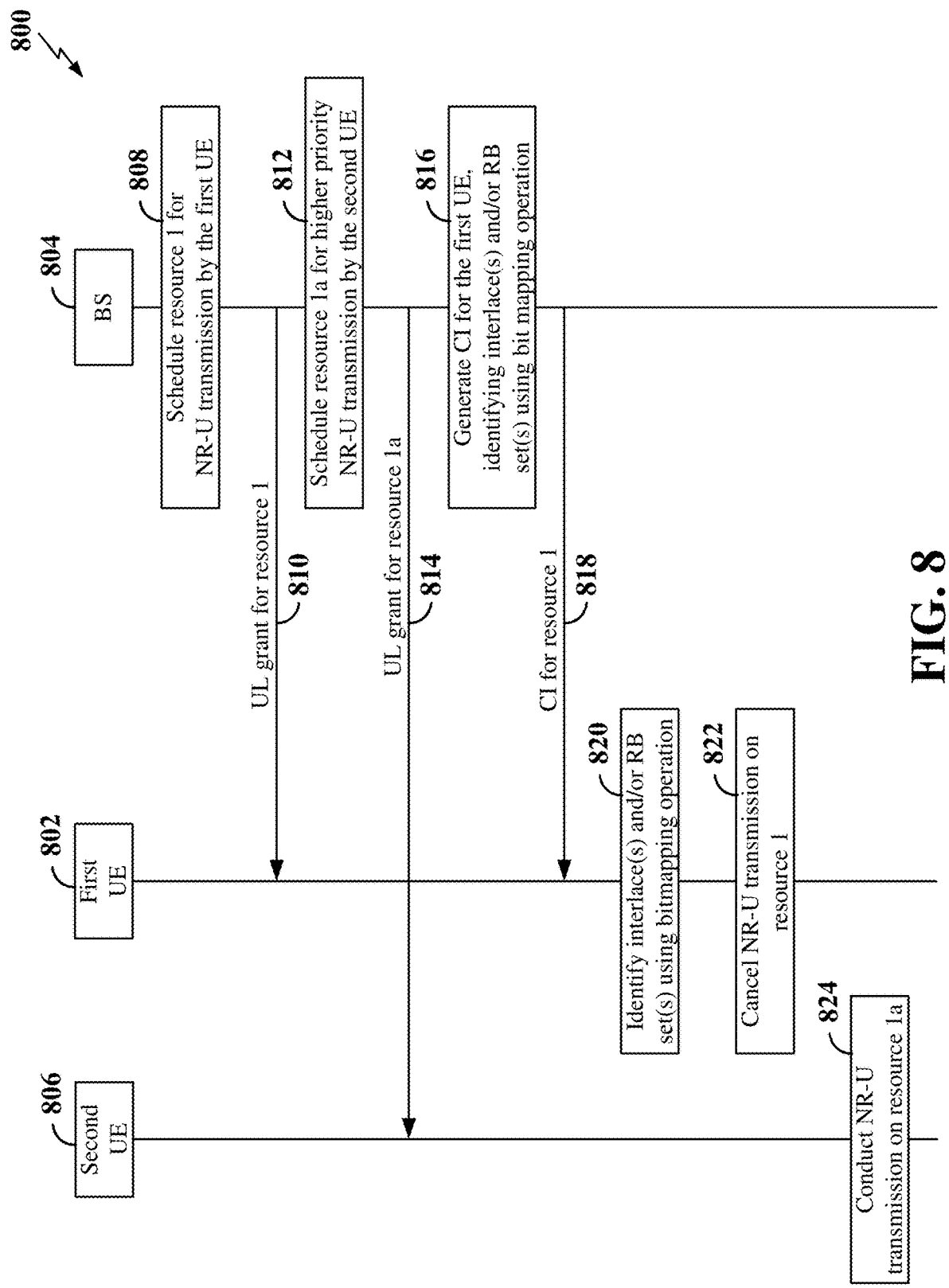
FIG. 8 is a signaling diagram illustrating an example of uplink cancelation- related signaling according to some aspects of the disclosure.

FIG. 8 illustrates an example of signaling in a communication system 800 according to the first example implementation. In this example, the system 800 includes a first UE 802, a BS 804 that operates in the unlicensed band, and a second UE 806. It should be appreciated that the system 800 would typically include other devices as well. In some implementations, the UE 802 and/or the UE 806 may correspond to the scheduled entity 106 of FIG. 1. In some implementations, the BS 804 may correspond to the scheduling entity 108 (e.g., a gNB, a transmit receive point, etc.) of FIG. 1.

At 808, the BS 804 schedules a resource (resource 1) for an NR-U transmission by the first UE 802.

At 810, the BS 804 sends an uplink grant to the first UE 802 that indicates the scheduled resource 1.

At 812, the BS determines that the second UE 806 has a higher priority transmission and therefore schedules a resource 1a for an NR-U transmission by the second UE 806. Here, resource 1a overlaps resource 1 at least in part. In some examples, resource 1a is a subset of resource 1. In some examples, a portion of resource 1a overlaps a portion of resource 1. In some examples, resource 1a could entirely overlap resource 1.

At 814, the BS 804 sends an uplink grant to the second UE 806 that indicates the scheduled resource 1a.

Accordingly, at 816, the BS 804 generates a CI to be sent to the first UE 802 to cancel the scheduled uplink transmission by the first UE 802 on resource 1. In some examples, the BS 804 may use a bit mapping operation as described herein (e.g., a table any of the formulas of Equation 1-6) to identify the interlace(s) and/or RB set(s) to be canceled.

At 818, the BS 804 sends the CI for resource 1 to the first UE 802.

At 820, the first UE 802 identifies the interlace(s) and/or RB set(s) to be canceled due to the CI. In some examples, the first UE 802 may use a bit mapping operation as described herein (e.g., a table any of the formulas of Equation 1-6) to identify the interlace(s) and/or RB set(s) to be canceled.

At 822, the first UE cancels its scheduled transmission on resource 1.

At 824, the second UE 806 conducts the uplink transmission on resource 1a.

Figure 9:
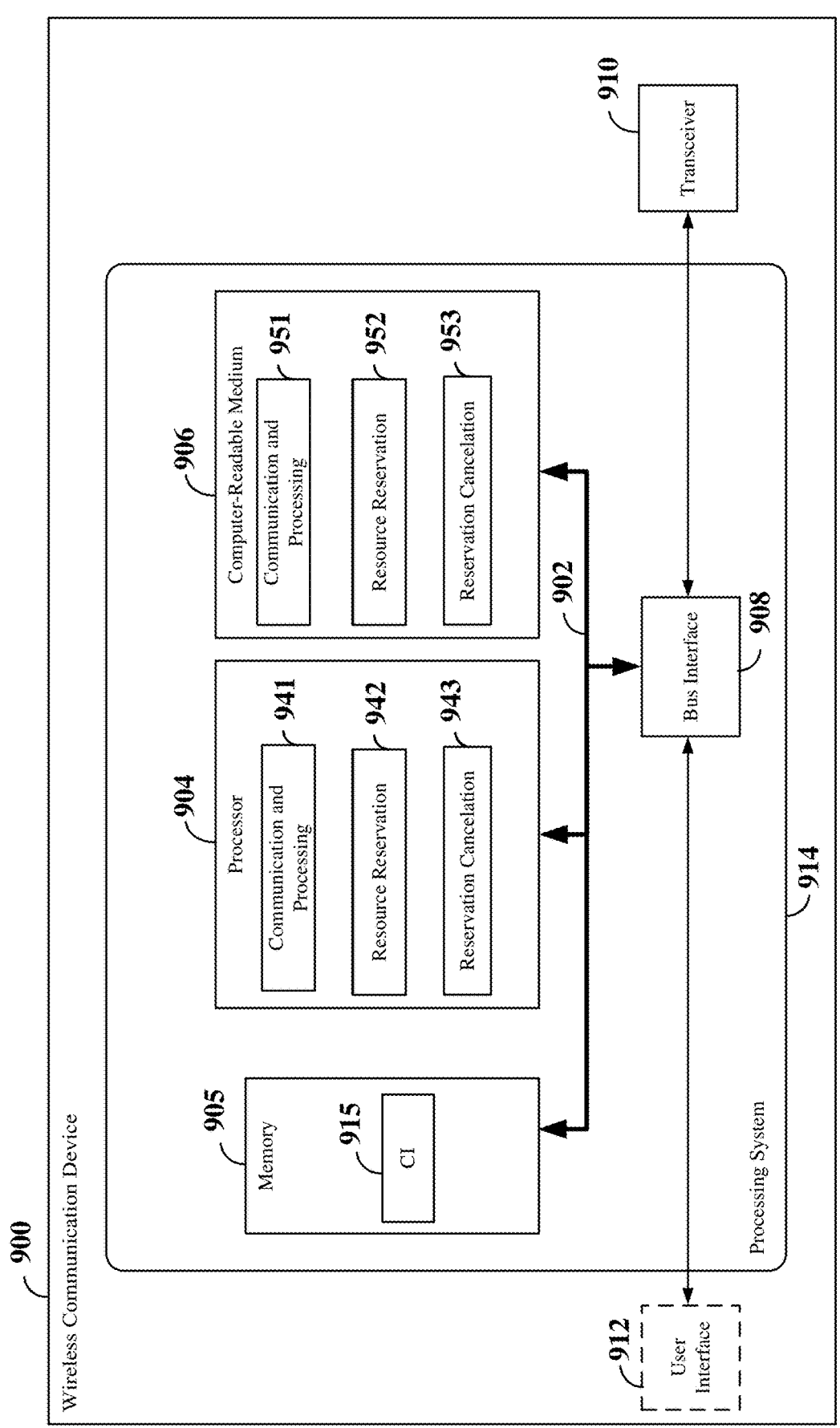
FIG. 9 is a block diagram conceptually illustrating an example of a hardware implementation for a communication device employing a processing system according to some aspects of the disclosure.

FIG. 9 is a diagram illustrating an example of a hardware implementation for a wireless communication device 900 employing a processing system 914. For example, the wireless communication device 900 may be a user equipment (UE) or other device configured to wirelessly communicate with a base station, as illustrated in any one or more of FIGS. 1-8. In accordance with various aspects of the disclosure, an element, or any portion of an element, or any combination of elements may be implemented with a processing system 914 that includes one or more processors 904. In some implementations, the wireless communication device 900 may correspond to the scheduled entity 106 of FIG. 1.

The wireless communication device 900 may be implemented with a processing system 914 that includes one or more processors 904. Examples of processors 904 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the wireless communication device 900 may be configured to perform any one or more of the functions described herein. That is, the processor 904, as utilized in a wireless communication device 900, may be used to implement any one or more of the processes and procedures described below.

In this example, the processing system 914 may be implemented with a bus architecture, represented generally by the bus 902. The bus 902 may include any number of interconnecting buses and bridges depending on the specific application of the processing system 914 and the overall design constraints. The bus 902 communicatively couples together various circuits including one or more processors (represented generally by the processor 904), a memory 905, and computer-readable media (represented generally by the computer-readable medium 906). The bus 902 may also link various other circuits such as timing sources, peripherals, voltage regulators, and power management circuits, which are well known in the art, and therefore, will not be described any further. A bus interface 908 provides an interface between the bus 902 and a transceiver 910 and between the bus 902 and an interface 930. The transceiver 910 provides a communication interface or means for communicating with various other apparatus over a wireless transmission medium. In some examples, the wireless communication device may include two or more transceivers 910, each configured to communicate with a respective network type (e.g., terrestrial or non-terrestrial). The interface 930 provides a communication interface or means of communicating with various other apparatus and devices (e.g., other devices housed within the same apparatus as the wireless communication device or other external apparatus) over an internal bus or external transmission medium, such as an Ethernet cable. Depending upon the nature of the apparatus, a user interface 912 (e.g., keypad, display, speaker, microphone, joystick) may also be provided. Of course, such a user interface 912 is optional, and may be omitted in some examples, such as an IoT device.

The processor 904 is responsible for managing the bus 902 and general processing, including the execution of software stored on the computer-readable medium 906. The software, when executed by the processor 904, causes the processing system 914 to perform the various functions described below for any particular apparatus. The computer-readable medium 906 and the memory 905 may also be used for storing data that is manipulated by the processor 904 when executing software.

One or more processors 904 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 906.

The computer-readable medium 906 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium 906 may reside in the processing system 914, external to the processing system 914, or distributed across multiple entities including the processing system 914. The computer-readable medium 906 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

In some aspects of the disclosure, the processor 904 may include circuitry configured for various functions. For example, the processor 904 may include communication and processing circuitry 941. The communication and processing circuitry 941 may include one or more hardware components that provide the physical structure that performs various processes related to wireless communication (e.g., signal reception and/or signal transmission) as described herein. The communication and processing circuitry 941 may further include one or more hardware components that provide the physical structure that performs various processes related to signal processing (e.g., processing a received signal and/or processing a signal for transmission) as described herein. In some examples, the communication and processing circuitry 941 may include two or more transmit/receive chains, each configured to process signals in a different RAT (or RAN) type. The communication and processing circuitry 941 may further be configured to execute communication and processing software 951 included on the computer-readable medium 906 to implement one or more functions described herein.

In some implementations where the communication involves receiving information, the communication and processing circuitry 941 may obtain information from a component of the wireless communication device 900 (e.g., from the transceiver 910 that receives the information via radio frequency signaling or some other type of signaling suitable for the applicable communication medium), process (e.g., decode) the information, and output the processed information. For example, the communication and processing circuitry 941 may output the information to another component of the processor 904, to the memory 905, or to the bus interface 908. In some examples, the communication and processing circuitry 941 may receive one or more of signals, messages, other information, or any combination thereof. In some examples, the communication and processing circuitry 941 may receive information via one or more channels. In some examples, the communication and processing circuitry 941 may include functionality for a means for receiving.

In some implementations where the communication involves sending (e.g., transmitting) information, the communication and processing circuitry 941 may obtain information (e.g., from another component of the processor 904, the memory 905, or the bus interface 908), process (e.g., encode) the information, and output the processed information. For example, the communication and processing circuitry 941 may output the information to the transceiver 910 (e.g., that transmits the information via radio frequency signaling or some other type of signaling suitable for the applicable communication medium). In some examples, the communication and processing circuitry 941 may send one or more of signals, messages, other information, or any combination thereof. In some examples, the communication and processing circuitry 941 may send information via one or more channels. In some examples, the communication and processing circuitry 941 may include functionality for a means for sending (e.g., means for transmitting).

The processor 904 may include resource reservation circuitry 942 configured to perform resource reservation-related operations as discussed herein. The resource reservation circuitry 942 may further be configured to execute resource reservation software 952 included on the computer-readable medium 906 to implement one or more functions described herein.

The processor 904 may include reservation cancelation circuitry 943 configured to perform reservation cancelation-related operations as discussed herein. The resource reservation circuitry 942 may include functionality for a means for receiving a cancelation indication. The reservation cancelation circuitry 943 may further be configured to execute reservation cancelation software 953 included on the computer-readable medium 906 to implement one or more functions described herein.

Figure 10:
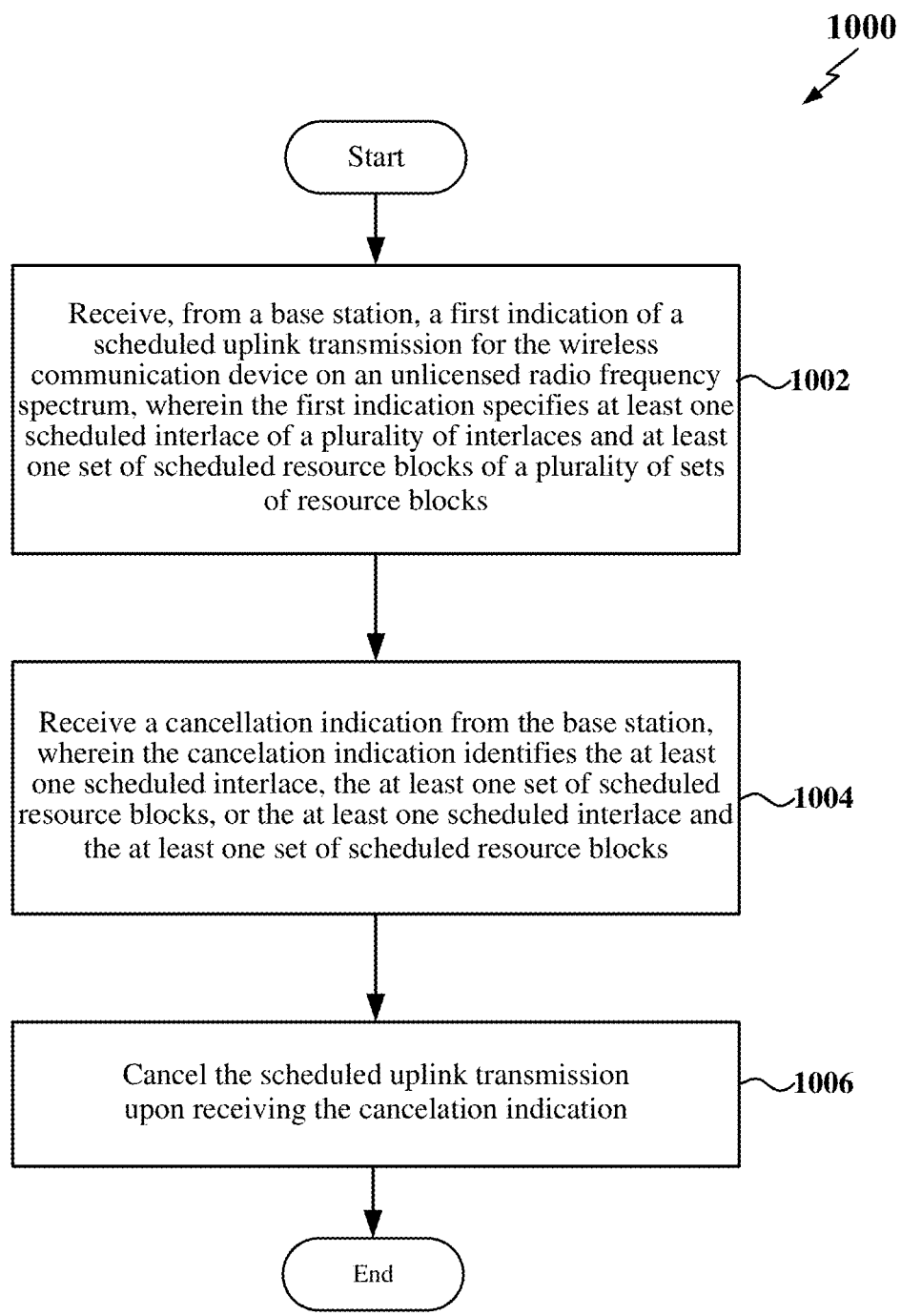
FIG. 10 is a flow chart illustrating an example wireless communication process according to some aspects of the disclosure.

FIG. 10 is a flow chart illustrating an example process 1000 for a wireless communication system in accordance with some aspects of the present disclosure. As described below, some or all illustrated features may be omitted in a particular implementation within the scope of the present disclosure, and some illustrated features may not be required for implementation of all embodiments. In some examples, the process 1000 may be carried out by the wireless communication device 900 illustrated in FIG. 9. In some aspects, the wireless communication device may be a user equipment. In some examples, the process 1000 may be carried out by any suitable apparatus or means for carrying out the functions or algorithm described below.

At block 1002, a wireless communication device may receive, from a base station, a first indication of a scheduled uplink transmission for the wireless communication device on an unlicensed radio frequency spectrum, wherein the first indication specifies at least one scheduled interlace of a plurality of interlaces and at least one set of scheduled resource blocks of a plurality of sets of resource blocks. For example, the communication and processing circuitry 941 and transceiver 910, shown and described above in connection with FIG. 9, may receive the first indication.

At block 1004, the wireless communication device may receive a cancelation indication from the base station, wherein the cancelation indication identifies the at least one scheduled interlace, the at least one set of scheduled resource blocks, or the at least one scheduled interlace and the at least one set of scheduled resource blocks. In some aspects, the cancelation indication may include a plurality of bits. In some aspects, the cancelation indication may include downlink control information (DCI) format 2_4. For example, the communication and processing circuitry 941 and transceiver 910, shown and described above in connection with FIG. 9, may receive the cancelation indication.

At block 1006, the wireless communication device may cancel the scheduled uplink transmission upon receiving the cancelation indication. For example, the reservation cancelation circuitry 943, shown and described above in connection with FIG. 9, may cancel the transmission.

In some aspects, the process may further include: performing a bit mapping operation to identify, from the cancelation indication, at least one of: a canceled interlace, a canceled set of resource blocks, or any combination thereof. In some aspects, the bit mapping operation may use a formula that prioritizes the plurality of sets of resource blocks over the plurality of interlaces. In some aspects, the bit mapping operation may use a formula that prioritizes the plurality of interlaces over the plurality of sets of resource blocks. In some aspects, the bit mapping operation may use a formula that identifies at least one canceled set of resource blocks and at least one canceled interlace.

In some aspects, the process may further include: identifying at least one canceled resource block based on one or more of the plurality of bits; and determining whether one or more of the at least one canceled resource block corresponds to the at least one set of scheduled resource blocks.

In some aspects, the process may further include: determining that the plurality of bits is greater in number than the plurality of sets of resource blocks; identifying at least one canceled resource block based on a first set of the plurality of bits after determining that the plurality of bits is greater in number than the plurality of sets of resource blocks; determining whether one or more of the at least one canceled resource block corresponds to the at least one set of scheduled resource blocks; identifying at least one canceled interlace based on a second set of the plurality of bits after determining that the plurality of bits is greater in number than the plurality of sets of resource blocks; and determining whether one or more of the at least one canceled interlace corresponds to the at least one scheduled interlace.

In some aspects, the process may further include: determining that the second set of the plurality of bits is fewer in number than the plurality of interlaces; identifying at least two canceled interlaces based on one bit of the second set of the plurality of bits after determining that the second set of the plurality of bits is fewer in number than the plurality of interlaces; and determining whether one or more of the at least two canceled interlaces corresponds to the at least one scheduled interlace.

In some aspects, the process may further include: identifying at least one canceled interlace based on one or more of the plurality of bits; and determining whether one or more of the at least one canceled interlace corresponds to the at least one scheduled interlace.

In some aspects, the process may further include: determining that the plurality of bits is fewer in number than the plurality of interlaces; identifying at least two canceled interlaces based on one bit of the plurality of bits after determining that the plurality of bits is fewer in number than the plurality of interlaces; and determining whether one or more of the at least two canceled interlaces corresponds to the at least one scheduled interlace.

In some aspects, the process may further include: determining that the plurality of bits is greater in number than the plurality of interlaces; identifying at least one canceled interlace based on a first set of the plurality of bits after determining that the plurality of bits is greater in number than the plurality of interlaces; determining whether one or more of the at least one canceled interlace corresponds to the at least one scheduled interlace; identifying at least one canceled resource block based on a second set of the plurality of bits after determining that the plurality of bits is greater in number than the plurality of interlaces; and determining whether one or more of the at least one canceled resource block corresponds to the at least one set of scheduled resource blocks.

In some aspects, the process may further include: determining that the second set of the plurality of bits is fewer in number than the plurality of sets of resource blocks; identifying at least two canceled resource blocks based on one bit of the second set of the plurality of bits after determining that the second set of the plurality of bits is fewer in number than the plurality of sets of resource blocks; and determining whether one or more of the at least two canceled resource blocks corresponds to the at least one set of scheduled resource blocks.

In some aspects, the process may further include: identifying at least one canceled resource block based on a first set of the plurality of bits; determining whether one or more of the at least one canceled resource block corresponds to the at least one set of scheduled resource blocks; identifying at least one canceled interlace based on a second set of the plurality of bits; and determining whether one or more of the at least one canceled interlace corresponds to the at least one scheduled interlace.

In some aspects, the process may further include: determining that the first set of the plurality of bits is fewer in number than the plurality of sets of resource blocks; identifying at least two canceled resource blocks based on one bit of the first set of the plurality of bits after determining that the first set of the plurality of bits is fewer in number than the plurality of sets of resource blocks; and determining whether one or more of the at least two canceled resource blocks corresponds to the at least one set of scheduled resource blocks.

In some aspects, the process may further include: determining that the second set of the plurality of bits is fewer in number than the plurality of interlaces; identifying at least two canceled interlaces based on one bit of the second set of the plurality of bits after determining that the second set of the plurality of bits is fewer in number than the plurality of interlaces; and determining whether one or more of the at least two canceled interlaces corresponds to the at least one scheduled interlace.

Figure 11:
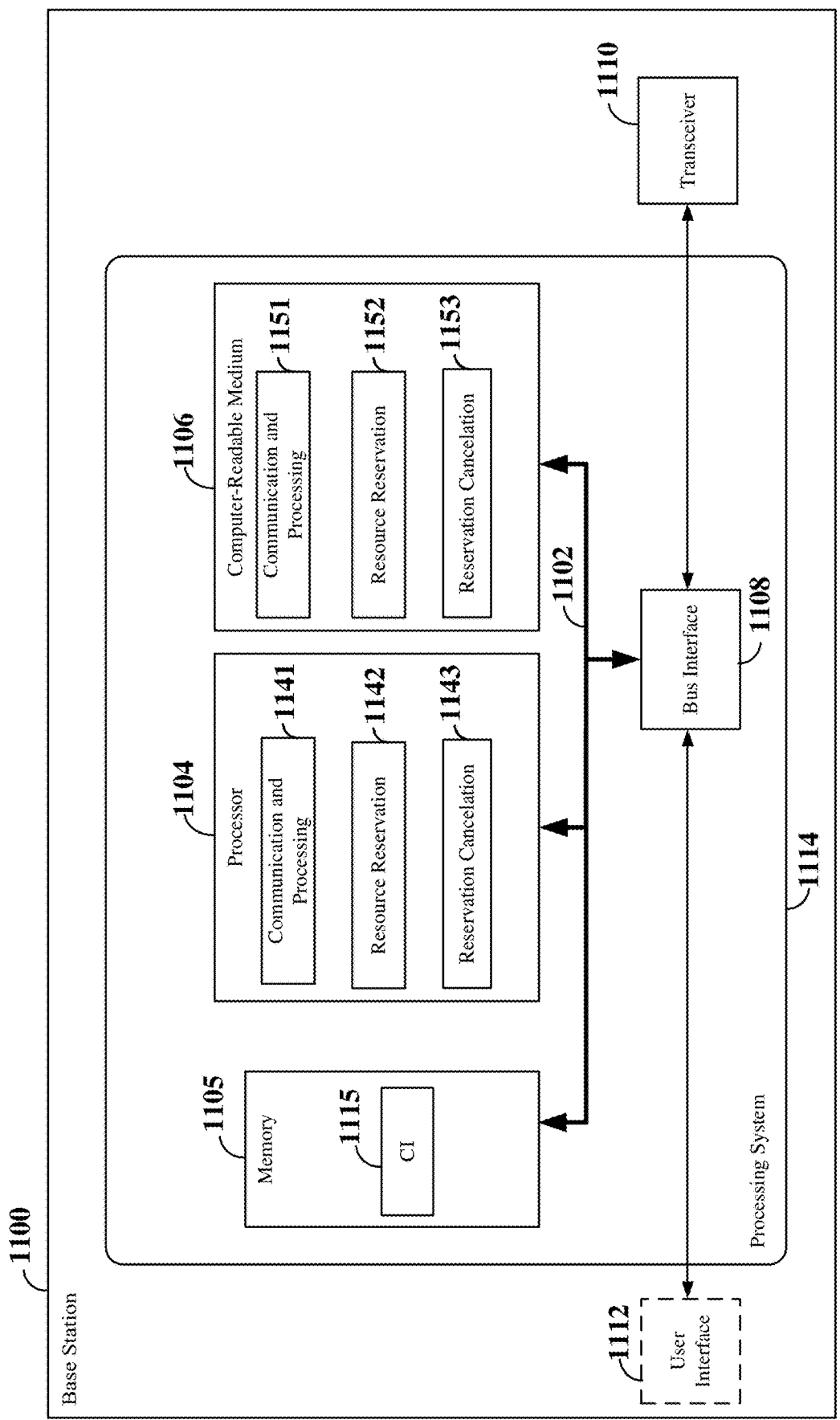
FIG. 11 is a block diagram conceptually illustrating an example of a hardware implementation for a communication device employing a processing system according to some aspects of the disclosure.

FIG. 11 is a conceptual diagram illustrating an example of a hardware implementation for base station (BS) 1100 employing a processing system 1114. In accordance with various aspects of the disclosure, an element, or any portion of an element, or any combination of elements may be implemented with a processing system 1114 that includes one or more processors 1104. In some implementations, the BS 1100 may correspond to the scheduling entity 108 (e.g., a gNB, a transmit receive point, etc.) of FIG. 1.

The processing system 1114 may be substantially the same as the processing system 914 illustrated in FIG. 9, including a bus interface 1108, a bus 1102, memory 1105, a processor 1104, and a computer-readable medium 1106. Furthermore, the core BS 1100 may include an interface 1130 (e.g., a network interface) that provides a means for communicating with various other apparatus within the core network and with one or more radio access network. The processor 1104, as utilized in BS 1100, may be used to implement any one or more of the processes described below. The wireless communication device 1100 may be configured to perform any one or more of the operations described below in conjunction with FIG. 12.

In some aspects of the disclosure, the processor 1104 may include communication and processing circuitry 1141. The communication and processing circuitry 1141 may include one or more hardware components that provide the physical structure that performs various processes related to communication (e.g., signal reception and/or signal transmission) as described herein. The communication and processing circuitry 1141 may further include one or more hardware components that provide the physical structure that performs various processes related to signal processing (e.g., processing a received signal and/or processing a signal for transmission) as described herein. The communication and processing circuitry 1141 may further be configured to execute communication and processing software 1151 included on the computer-readable medium 906 to implement one or more functions described herein.

In some implementations where the communication involves receiving information, the communication and processing circuitry 1141 may obtain information from a component of the wireless communication device 1100 (e.g., from the transceiver 1110 that receives the information via radio frequency signaling or some other type of signaling suitable for the applicable communication medium), process (e.g., decode) the information, and output the processed information. For example, the communication and processing circuitry 1141 may output the information to another component of the processor 1104, to the memory 1105, or to the bus interface 1108. In some examples, the communication and processing circuitry 1141 may receive one or more of signals, messages, other information, or any combination thereof. In some examples, the communication and processing circuitry 1141 may receive information via one or more channels. In some examples, the communication and processing circuitry 1141 may include functionality for a means for receiving.

In some implementations where the communication involves sending (e.g., transmitting) information, the communication and processing circuitry 1141 may obtain information (e.g., from another component of the processor 1104, the memory 1105, or the bus interface 1108), process (e.g., encode) the information, and output the processed information. For example, the communication and processing circuitry 1141 may output the information to the transceiver 1110 (e.g., that transmits the information via radio frequency signaling or some other type of signaling suitable for the applicable communication medium). In some examples, the communication and processing circuitry 1141 may send one or more of signals, messages, other information, or any combination thereof. In some examples, the communication and processing circuitry 1141 may send information via one or more channels. In some examples, the communication and processing circuitry 1141 may include functionality for a means for sending (e.g., means for transmitting).

The processor 1104 may include resource reservation circuitry 1142 configured to perform resource reservation-related operations as discussed herein. The resource reservation circuitry 1142 may include functionality for a means for determining that a second scheduled uplink transmission on the unlicensed radio frequency band is associated with a second priority. The resource reservation circuitry 1142 may further be configured to execute resource reservation software 1152 included on the computer-readable medium 1106 to implement one or more functions described herein.

The processor 1104 may include reservation cancelation circuitry 1143 configured to perform reservation cancelation-related operations as discussed herein. The reservation cancelation circuitry 1143 may include functionality for a means for generating a cancelation indication. The reservation cancelation circuitry 1143 may further be configured to execute reservation cancelation software 1153 included on the computer-readable medium 1106 to implement one or more functions described herein.

Figure 12:
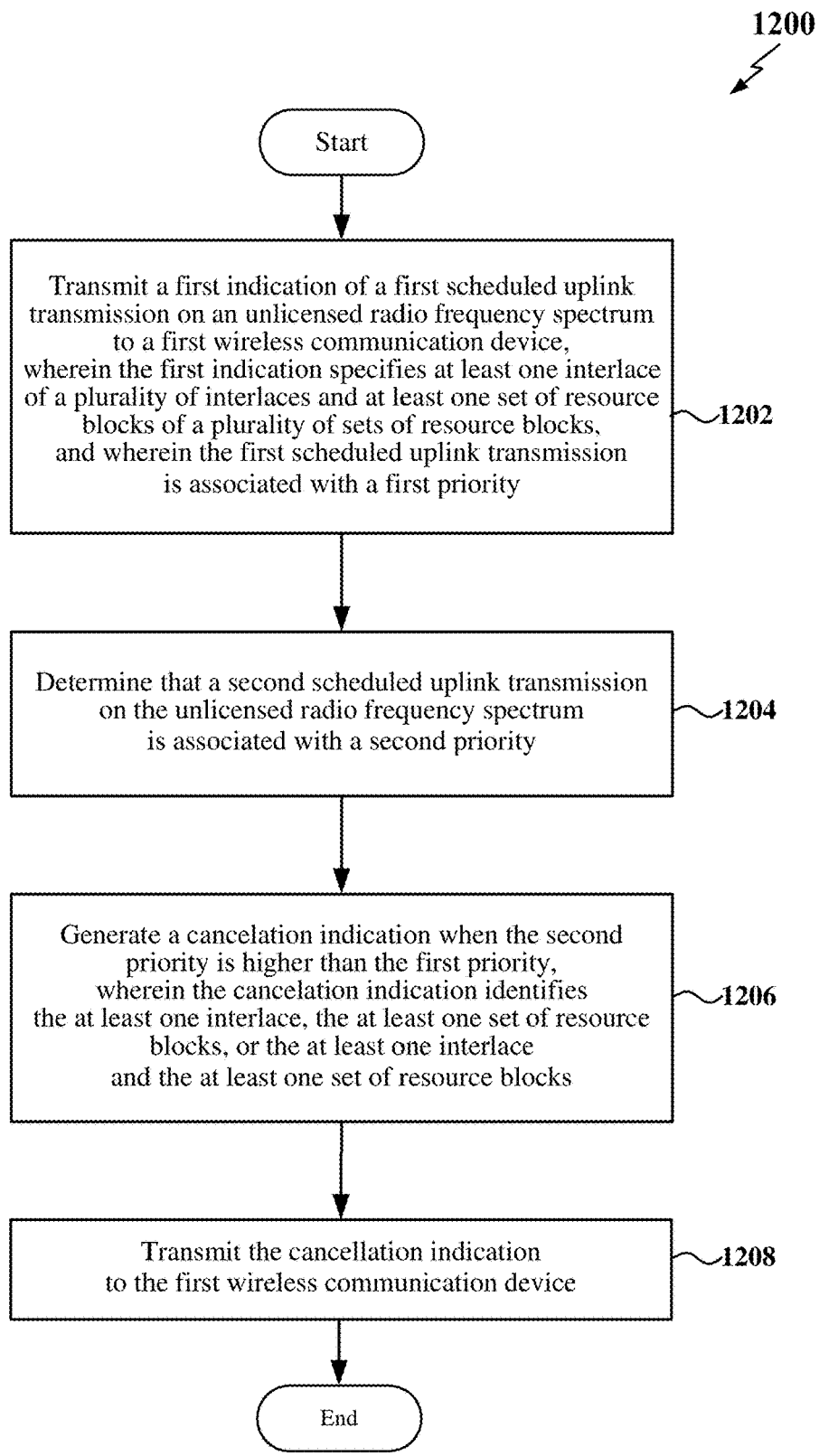
FIG. 12 is a flow chart illustrating an example wireless communication process according to some aspects of the disclosure.

FIG. 12 is a flow chart illustrating another example process 1200 for a wireless communication system in accordance with some aspects of the present disclosure. As described below, some or all illustrated features may be omitted in a particular implementation within the scope of the present disclosure, and some illustrated features may not be required for implementation of all embodiments. In some examples, the process 1200 may be carried out by the BS 1100 illustrated in FIG. 11. In some examples, the process 1200 may be carried out by any suitable apparatus or means for carrying out the functions or algorithm described below.

At block 1202, a BS may transmit a first indication of a first scheduled uplink transmission on an unlicensed radio frequency spectrum to a first wireless communication device, wherein the first indication specifies at least one interlace of a plurality of interlaces and at least one set of resource blocks of a plurality of sets of resource blocks, and wherein the first scheduled uplink transmission is associated with a first priority. For example, the communication and processing circuitry 1141 and transceiver 1110, shown and described above in connection with FIG. 1, may transmit the indication.

At block 1204, the BS may determine that a second scheduled uplink transmission on the unlicensed radio frequency spectrum is associated with a second priority. For example, the resource reservation circuitry 1142, shown and described above in connection with FIG. 1, may determine the priority of a scheduled transmission.

At block 1206, the BS may generate a cancelation indication when the second priority is higher than the first priority, wherein the cancelation indication identifies the at least one interlace, the at least one set of resource blocks, or the at least one interlace and the at least one set of resource blocks. In some aspects, the cancelation indication may include a plurality of bits. In some aspects, the cancelation indication may include downlink control information (DCI) format 2_4. For example, the reservation cancelation circuitry 1143, shown and described above in connection with FIG. 1, may generate the cancelation indication.

In some aspects, generating the cancelation indication may include: determining that the plurality of bits is fewer in number than the plurality of sets of resource blocks; and designating at least two sets of resource blocks of the plurality of sets of resource blocks by one bit of the plurality of bits after determining that the plurality of bits is fewer in number than the plurality of sets of resource blocks.

In some aspects, generating the cancelation indication may include: determining that the plurality of bits is greater in number than the plurality of sets of resource blocks; designating the plurality of sets of resource blocks by a first set of the plurality of bits after determining that the plurality of bits is greater in number than the plurality of sets of resource blocks; and designating the plurality of interlaces by a second set of the plurality of bits after determining that the plurality of bits is greater in number than the plurality of sets of resource blocks.

In some aspects, generating the cancelation indication may include: determining that the second set of the plurality of bits is fewer in number than the plurality of interlaces; and designating at least two interlaces of the plurality of interlaces by one bit of the second set of the plurality of bits after determining that the second set of the plurality of bits is fewer in number than the plurality of interlaces.

In some aspects, generating the cancelation indication may include: determining that the plurality of bits is fewer in number than the plurality of interlaces; and designating at least two interlaces of the plurality of interlaces by one bit of the plurality of bits after determining that the plurality of bits is fewer in number than the plurality of interlaces.

In some aspects, generating the cancelation indication may include: determining that the plurality of bits is greater in number than the plurality of interlaces; designating the plurality of interlaces by a first set of the plurality of bits after determining that the plurality of bits is greater in number than the plurality of interlaces; and designating the plurality of sets of resource blocks by a second set of the plurality of bits after determining that the plurality of bits is greater in number than the plurality of interlaces.

In some aspects, generating the cancelation indication may include: determining that the second set of the plurality of bits is fewer in number than the plurality of sets of resource blocks; and designating at least two sets of resource blocks of the plurality of sets of resource blocks by one bit of the second set of the plurality of bits after determining that the second set of the plurality of bits is fewer in number than the plurality of sets of resource blocks.

In some aspects, generating the cancelation indication may include: designating the plurality of sets of resource blocks by a first set of the plurality of bits; and designating the plurality of interlaces by a second set of the plurality of bits.

In some aspects, generating the cancelation indication may include: determining that the first set of the plurality of bits is fewer in number than the plurality of sets of resource blocks; and designating at least two sets of resource blocks of the plurality of sets of resource blocks by one bit of the first set of the plurality of bits after determining that the first set of the plurality of bits is fewer in number than the plurality of sets of resource blocks.

In some aspects, generating the cancelation indication may include: determining that the second set of the plurality of bits is fewer in number than the plurality of interlaces; and designating at least two interlaces of the plurality of interlaces by one bit of the second set of the plurality of bits after determining that the second set of the plurality of bits is fewer in number than the plurality of interlaces.

At block 1208, the BS may transmit the cancelation indication to the first wireless communication device. For example, the communication and processing circuitry 1141 and transceiver 1110, shown and described above in connection with FIG. 1, may transmit the indication.

In some aspects, the process may further include: performing a bit mapping operation to designate, in the cancelation indication, at least one of: a canceled interlace, a canceled set of resource blocks, or any combination thereof. In some aspects, the bit mapping operation may use a formula that prioritizes the plurality of sets of resource blocks over the plurality of interlaces. In some aspects, the bit mapping operation may use a formula that prioritizes the plurality of interlaces over the plurality of sets of resource blocks. In some aspects, the bit mapping operation may use a formula that designates, in the cancelation indication, at least one canceled set of resource blocks and at least one canceled interlace.

Several aspects of a wireless communication network have been presented with reference to an example implementation. As those skilled in the art will readily appreciate, various aspects described throughout this disclosure may be extended to other telecommunication systems, network architectures and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-10 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1-8 may be configured to perform one or more of the methods, features, or steps escribed herein. The novel algorithms described herein may also be efficiently implemented in software and/or embedded in hardware.

It is to be understood that the specific order or hierarchy of steps in the methods disclosed is an illustration of example processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

The invention claimed is:

1. A method of communication at a wireless communication device, the method comprising:
receiving, from a network entity, a first indication of a scheduled uplink transmission for the wireless communication device on an unlicensed radio frequency spectrum, wherein the first indication specifies at least one scheduled interlace of a plurality of interlaces and at least one set of scheduled resource blocks of a plurality of sets of resource blocks;
receiving a cancelation indication from the network entity, wherein the cancelation indication identifies the at least one scheduled interlace, the at least one set of scheduled resource blocks, or the at least one scheduled interlace and the at least one set of scheduled resource blocks;
performing a bit mapping operation to identify, from the cancelation indication: at least one canceled interlace, at least one canceled resource block, or any combination thereof, wherein the bit mapping operation uses a formula that prioritizes the plurality of sets of resource blocks over the plurality of interlaces by first allocating bits of a plurality of bits to resource blocks and if there are remaining bits of the plurality of bits by allocating bits to interlaces; and
canceling the scheduled uplink transmission upon receiving the cancelation indication.

2. The method of claim 1, wherein the bit mapping operation identifies the at least one canceled resource block and the at least one canceled interlace.

3. The method of claim 1, wherein the cancelation indication comprises the plurality of bits.

4. The method of claim 3, further comprising:
identifying the at least one canceled resource block based on one or more of the plurality of bits; and
determining whether one or more of the at least one canceled resource block corresponds to the at least one set of scheduled resource blocks.

5. The method of claim 3, further comprising:
determining that the plurality of bits is fewer in number than the plurality of sets of resource blocks;
identifying at least two canceled resource blocks based on one bit of the plurality of bits after determining that the plurality of bits is fewer in number than the plurality of sets of resource blocks; and
determining whether one or more of the at least two canceled resource blocks corresponds to the at least one set of scheduled resource blocks.

6. The method of claim 3, further comprising:
determining that the plurality of bits is greater in number than the plurality of sets of resource blocks;
identifying the at least one canceled resource block based on a first set of the plurality of bits after determining that the plurality of bits is greater in number than the plurality of sets of resource blocks;
determining whether one or more of the at least one canceled resource block corresponds to the at least one set of scheduled resource blocks;
identifying the at least one canceled interlace based on a second set of the plurality of bits after determining that the plurality of bits is greater in number than the plurality of sets of resource blocks; and
determining whether one or more of the at least one canceled interlace corresponds to the at least one scheduled interlace.

7. The method of claim 6, further comprising:
determining that the second set of the plurality of bits is fewer in number than the plurality of interlaces;
identifying at least two canceled interlaces based on one bit of the second set of the plurality of bits after determining that the second set of the plurality of bits is fewer in number than the plurality of interlaces; and
determining whether one or more of the at least two canceled interlaces corresponds to the at least one scheduled interlace.

8. The method of claim 3, further comprising:
identifying the at least one canceled interlace based on one or more of the plurality of bits; and
determining whether one or more of the at least one canceled interlace corresponds to the at least one scheduled interlace.

9. The method of claim 3, further comprising:
determining that the plurality of bits is fewer in number than the plurality of interlaces;
identifying at least two canceled interlaces based on one bit of the plurality of bits after determining that the plurality of bits is fewer in number than the plurality of interlaces; and
determining whether one or more of the at least two canceled interlaces corresponds to the at least one scheduled interlace.

10. The method of claim 3, further comprising:
determining that the plurality of bits is greater in number than the plurality of interlaces;
identifying the at least one canceled interlace based on a first set of the plurality of bits after determining that the plurality of bits is greater in number than the plurality of interlaces;
determining whether one or more of the at least one canceled interlace corresponds to the at least one scheduled interlace;
identifying the at least one canceled resource block based on a second set of the plurality of bits after determining that the plurality of bits is greater in number than the plurality of interlaces; and
determining whether one or more of the at least one canceled resource block corresponds to the at least one set of scheduled resource blocks.

11. The method of claim 10, further comprising:
determining that the second set of the plurality of bits is fewer in number than the plurality of sets of resource blocks;
identifying at least two canceled resource blocks based on one bit of the second set of the plurality of bits after determining that the second set of the plurality of bits is fewer in number than the plurality of sets of resource blocks; and
determining whether one or more of the at least two canceled resource blocks corresponds to the at least one set of scheduled resource blocks.

12. The method of claim 3, further comprising:
identifying the at least one canceled resource block based on a first set of the plurality of bits;
determining whether one or more of the at least one canceled resource block corresponds to the at least one set of scheduled resource blocks;
identifying the at least one canceled interlace based on a second set of the plurality of bits; and
determining whether one or more of the at least one canceled interlace corresponds to the at least one scheduled interlace.

13. The method of claim 12, further comprising:
determining that the first set of the plurality of bits is fewer in number than the plurality of sets of resource blocks;
identifying at least two canceled resource blocks based on one bit of the first set of the plurality of bits after determining that the first set of the plurality of bits is fewer in number than the plurality of sets of resource blocks; and
determining whether one or more of the at least two canceled resource blocks corresponds to the at least one set of scheduled resource blocks.

14. The method of claim 12, further comprising:
determining that the second set of the plurality of bits is fewer in number than the plurality of interlaces;
identifying at least two canceled interlaces based on one bit of the second set of the plurality of bits after determining that the second set of the plurality of bits is fewer in number than the plurality of interlaces; and
determining whether one or more of the at least two canceled interlaces corresponds to the at least one scheduled interlace.

15. The method of claim 1, wherein the cancelation indication comprises a downlink control information (DCI) format 2_4.

16. A wireless communication device, comprising:
one or more memories that store processor-executable code; and
one or more processors configured to execute the processor-executable code and cause the wireless communication device to:
receive, from a network entity, a first indication of a scheduled uplink transmission for the wireless communication device on an unlicensed radio frequency spectrum, wherein the first indication specifies at least one scheduled interlace of a plurality of interlaces and at least one set of scheduled resource blocks of a plurality of sets of resource blocks;
receive a cancelation indication from the network entity, wherein the cancelation indication identifies the at least one scheduled interlace, the at least one set of scheduled resource blocks, or the at least one scheduled interlace and the at least one set of scheduled resource blocks;
perform a bit mapping operation to identify, from the cancelation indication: at least one canceled interlace, at least one canceled resource block, or any combination thereof, wherein the bit mapping operation uses a formula that prioritizes the plurality of sets of resource blocks over the plurality of interlaces by a first allocation of bits of a plurality of bits to resource blocks and if there are remaining bits of the plurality of bits by a second allocation of bits to interlaces; and
cancel the scheduled uplink transmission upon receiving the cancelation indication.

17. A method of communication at a network entity, the method comprising:
transmitting a first indication of a first scheduled uplink transmission on an unlicensed radio frequency spectrum to a first wireless communication device, wherein the first indication specifies at least one interlace of a plurality of interlaces and at least one set of resource blocks of a plurality of sets of resource blocks, and wherein the first scheduled uplink transmission is associated with a first priority;
determining that a second scheduled uplink transmission on the unlicensed radio frequency spectrum is associated with a second priority;
generating a cancelation indication when the second priority is higher than the first priority, wherein the cancelation indication identifies the at least one interlace, the at least one set of resource blocks, or the at least one interlace and the at least one set of resource blocks;
performing a bit mapping operation to designate, in the cancelation indication: at least one canceled interlace, at least one canceled resource block, or any combination thereof, wherein the bit mapping operation uses a formula that prioritizes the plurality of sets of resource blocks over the plurality of interlaces by first allocating bits of a plurality of bits to resource blocks and if there are remaining bits of the plurality of bits by allocating bits to interlaces; and transmitting the cancelation indication to the first wireless communication device.

18. The method of claim 17, wherein the bit mapping operation designates, in the cancelation indication, the at least one canceled resource block and at least one canceled interlace.

19. The method of claim 17, wherein the cancelation indication comprises the plurality of bits.

20. The method of claim 19, wherein generating the cancelation indication comprises:
determining that the plurality of bits is fewer in number than the plurality of sets of resource blocks; and
designating at least two sets of resource blocks of the plurality of sets of resource blocks by one bit of the plurality of bits after determining that the plurality of bits is fewer in number than the plurality of sets of resource blocks.

21. The method of claim 19, wherein generating the cancelation indication comprises:
determining that the plurality of bits is greater in number than the plurality of sets of resource blocks;
designating the plurality of sets of resource blocks by a first set of the plurality of bits after determining that the plurality of bits is greater in number than the plurality of sets of resource blocks; and
designating the plurality of interlaces by a second set of the plurality of bits after determining that the plurality of bits is greater in number than the plurality of sets of resource blocks.

22. The method of claim 21, wherein generating the cancelation indication further comprises:
determining that the second set of the plurality of bits is fewer in number than the plurality of interlaces; and
designating at least two interlaces of the plurality of interlaces by one bit of the second set of the plurality of bits after determining that the second set of the plurality of bits is fewer in number than the plurality of interlaces.

23. The method of claim 19, wherein generating the cancelation indication comprises:
determining that the plurality of bits is fewer in number than the plurality of interlaces; and
designating at least two interlaces of the plurality of interlaces by one bit of the plurality of bits after determining that the plurality of bits is fewer in number than the plurality of interlaces.

24. The method of claim 19, wherein generating the cancelation indication comprises:
determining that the plurality of bits is greater in number than the plurality of interlaces;
designating the plurality of interlaces by a first set of the plurality of bits after determining that the plurality of bits is greater in number than the plurality of interlaces; and
designating the plurality of sets of resource blocks by a second set of the plurality of bits after determining that the plurality of bits is greater in number than the plurality of interlaces.

25. The method of claim 24, wherein generating the cancelation indication further comprises:
determining that the second set of the plurality of bits is fewer in number than the plurality of sets of resource blocks; and
designating at least two sets of resource blocks of the plurality of sets of resource blocks by one bit of the second set of the plurality of bits after determining that the second set of the plurality of bits is fewer in number than the plurality of sets of resource blocks.

26. The method of claim 19, wherein generating the cancelation indication comprises:
designating the plurality of sets of resource blocks by a first set of the plurality of bits; and
designating the plurality of interlaces by a second set of the plurality of bits.

27. The method of claim 26, wherein generating the cancelation indication further comprises:
determining that the first set of the plurality of bits is fewer in number than the plurality of sets of resource blocks; and
designating at least two sets of resource blocks of the plurality of sets of resource blocks by one bit of the first set of the plurality of bits after determining that the first set of the plurality of bits is fewer in number than the plurality of sets of resource blocks.

28. The method of claim 26, wherein generating the cancelation indication further comprises:
determining that the second set of the plurality of bits is fewer in number than the plurality of interlaces; and
designating at least two interlaces of the plurality of interlaces by one bit of the second set of the plurality of bits after determining that the second set of the plurality of bits is fewer in number than the plurality of interlaces.

29. A network entity, comprising:
one or more memories that store processor-executable code; and
one or more processors configured to execute the processor-executable code and cause the network entity to:
transmit a first indication of a first scheduled uplink transmission on an unlicensed radio frequency spectrum to a first wireless communication device, wherein the first indication specifies at least one interlace of a plurality of interlaces and at least one set of resource blocks of a plurality of sets of resource blocks, and wherein the first scheduled uplink transmission is associated with a first priority;
determine that a second scheduled uplink transmission on the unlicensed radio frequency spectrum is associated with a second priority;
generate a cancelation indication when the second priority is higher than the first priority, wherein the cancelation indication identifies the at least one interlace, the at least one set of resource blocks, or the at least one interlace and the at least one set of resource blocks;
perform a bit mapping operation to designate, in the cancelation indication: at least one canceled interlace, at least one canceled resource block, or any combination thereof, wherein the bit mapping operation uses a formula that prioritizes the plurality of sets of resource blocks over the plurality of interlaces by a first allocation of bits of a plurality of bits to resource blocks and if there are remaining bits of the plurality of bits by a second allocation of bits to interlaces; and
transmit the cancelation indication to the first wireless communication device.

* * * * *